(12) United States Patent
Yazaki et al.

(10) Patent No.: US 7,669,744 B2
(45) Date of Patent: Mar. 2, 2010

(54) DEVICE AND METHOD FOR CLEAVING OPTICAL FIBERS

(75) Inventors: Akihiko Yazaki, Tokyo (JP); Takaya Yamauchi, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 201 days.

(21) Appl. No.: 10/595,078

(22) PCT Filed: Jul. 19, 2004

(86) PCT No.: PCT/US2004/023260

§ 371 (c)(1),
(2), (4) Date: Jan. 31, 2006

(87) PCT Pub. No.: WO2005/017584

PCT Pub. Date: Feb. 24, 2005

(65) Prior Publication Data

US 2006/0201982 A1    Sep. 14, 2006

(30) Foreign Application Priority Data

Aug. 4, 2003    (JP)    ............... 2003-205756

(51) Int. Cl.
*B26F 3/00* (2006.01)
*B26D 1/00* (2006.01)
*B26D 3/00* (2006.01)
*B26D 3/08* (2006.01)
*B31B 1/25* (2006.01)
*G02B 6/00* (2006.01)

(52) U.S. Cl. .............. 225/1; 225/96.5; 83/13; 83/879; 83/880; 385/134; 385/136

(58) Field of Classification Search ............... 225/96.5, 225/2, 94; 83/13, 879, 880, 885; 385/134, 385/136

See application file for complete search history.

(56) References Cited

U.S. PATENT DOCUMENTS 4,667,862 A * 5/1987 Millar et al. ................. 225/2

(Continued)

FOREIGN PATENT DOCUMENTS

JP    61-148407    7/1986

(Continued)

*Primary Examiner*—Ghassem Alie
*Assistant Examiner*—Bharat C Patel
(74) *Attorney, Agent, or Firm*—Gregg H. Rosenblatt

(57) ABSTRACT

An optical fiber cleaving device includes an auxiliary support section movably disposed on a base section independently from a blade section and a pusher section. The auxiliary support section can be selectively disposed at the operable position for supporting an unsheathed optical fiber in cooperation with a pair of clamp sections. The auxiliary support section is constituted by a thin plate member having fiber support faces locally located between the clamp sections at the operable position and a relief area formed adjacent to the fiber support faces. The fiber support faces come in contact with the portions of a local length of the unsheathed optical fiber extending between the clamp sections, the local length being located away from the fiber cleaving position, and the relief area is so arranged as to avoid the contact with a portion of a second local length of the unsheathed optical fiber, located at the fiber cleaving position. The cleaving device can provide highly accurate cleaving for optical fibers having different fiber structures without changing the preset conditions for the clamp sections.

3 Claims, 14 Drawing Sheets

U.S. PATENT DOCUMENTS

| | | | |
|---|---|---|---|
| 5,024,363 A * | 6/1991 | Suda et al. | 225/96.5 |
| 5,031,321 A * | 7/1991 | Briscoe | 30/134 |
| 5,104,021 A * | 4/1992 | Seike et al. | 225/2 |
| 5,106,006 A * | 4/1992 | Suda et al. | 225/2 |
| 5,154,333 A * | 10/1992 | Bauer et al. | 225/1 |
| 5,297,710 A * | 3/1994 | Juras | 225/2 |
| 5,395,025 A * | 3/1995 | Borer et al. | 225/2 |
| 5,813,902 A * | 9/1998 | Wiegand | 451/65 |
| 5,838,850 A * | 11/1998 | Mansfield et al. | 385/31 |
| 5,839,635 A * | 11/1998 | Mansfield et al. | 225/96.5 |
| 6,634,079 B1 * | 10/2003 | Kazama | 29/564.4 |
| 6,754,426 B2 * | 6/2004 | Lee et al. | 385/136 |
| 7,391,951 B2 * | 6/2008 | Hayashi et al. | 385/134 |

FOREIGN PATENT DOCUMENTS

| | | |
|---|---|---|
| JP | 05-027122 A | 2/1993 |
| JP | 06-294914 | 10/1994 |

* cited by examiner

DEVICE AND METHOD FOR CLEAVING OPTICAL FIBERS

DETAILED DESCRIPTION OF THE INVENTION

1. Technical Field of the Invention the present invention relates to an optical fiber cleaving device and an optical fiber cleaving method.

2. Background

In the optical fiber cleaving technology, there has been known a cleaving device comprising a pair of clamp sections arranged maintaining a predetermined gap, a moving blade section capable of bringing the edge thereof to a fiber cleaving position defined between the clamp sections, and a moving pusher section capable of bringing the pushing faces thereof to the fiber cleaving position independently of the blade section, which are arranged on a base section (see, e.g., a patent document 1, U.S. Pat. No. 5,395,025). In the cleaving process by using this cleaving device, first, the sheath of the optical fiber is, first, removed from an end thereof over a desired length to expose the fiber, and this unsheathed optical fiber is supported in a fixed manner on the pair of clamp sections so as to extend therebetween. In this state, the blade section is moved straight on the base section in a direction at right angles with the unsheathed optical fiber to score (scribe), by using the edge thereof, the outer surface of the cladding at a target point of the unsheathed optical fiber placed at the fiber cleaving position nearly at right angles with the axis of the fiber. Then, the blade section is moved away from the fiber cleaving position, the pusher section is caused to swing on the base section such that the pushing faces forcibly enter into the fiber cleaving position, and a pushing force is exerted on the unsheathed optical fiber supported between the clamp sections from the side opposite to the score. Then, the tensile stress generates in the unsheathed optical fiber with the score as a center, and the unsheathed optical fiber is cleaved and cut at the predetermined portion.

The above-mentioned cleaving device and cleaving method have heretofore been widely used since they are capable of easily and reliably forming the end surfaces at the cleaved surfaces of the unsheathed optical fiber having a core of a glass, suppressing incompleteness such as inclination, undulation and roughness to lie within allowable ranges. Here, to stably form mirror-like end surfaces at right angles on the unsheathed optical fiber, a relative positional relationship that is precisely determined in advance must be maintained with high precision between the unsheathed optical fiber supported between the clamp sections and the edge of the blade section that moves passing through the fiber cleaving position. That is, the cleaving device must be capable of scribing the cladding of the optical fiber to be cleaved maintaining a size that is necessary and sufficient (scribing depth, etc.) maintaining high accuracy and good reproduceability. Therefore, the cleaving device of this type usually has a constitution which secures the optical fiber of a particular fiber structure (materials of core and clad, diameters, etc.) in a state of maintaining an optimum positional relationship between the clamp sections and the blade section. There has been known the cleaving device dedicated to the special optical fibers, which permits the height of edge of the blade section to be finely adjusted in the order of microns on the base section.

There has further been proposed a cleaving device of the above type featuring a general applicability to deal with unsheathed optical fibers of a plurality of types having different outer diameters by producing an optimum tensile stress relying upon the pushing action of the pushing section after the cladding has been scribed (see, e.g., a patent document 2, JP Unexamined Patent Publication (Kokai) No. 6-294914). In this cleaving device, a pair of clamp sections disposed on the base section are so constituted as to be selectively moved in the directions of approaching each other and separating away from each other. Further, each clamp section is constituted by a clamp plate moving on the base section and a holder plate detachably mounted on the clamp plate. The gap between the clamp sections is adjusted to an optimum value depending upon the outer diameter of the unsheathed optical fiber that is to be cleaved. Upon replacing the holder plate by the one having an optimum width, cleaved surfaces (end surfaces of the unsheathed fiber) of a high quality can be formed on the unsheathed optical fibers of dissimilar outer diameters by optimizing the curvatures of deflection at the time of cleavage by the pushing force. The cleaving device described in the patent document 2 further has a holding plate for holding the unsheathed optical fiber in a contacting manner on the side opposite to the edge of the blade section at the time of scribing the outer surface of the cladding of the unsheathed optical fiber.

SUMMARY

It is an object of the present invention to provide an optical fiber cleaving device for cleaving an unsheathed optical fiber extending between the clamp sections by scribing the surface thereof with the edge of the blade section and then pushing it, wherein scores are easily and reliably imparted to the surfaces of the unsheathed fibers to a degree necessary and sufficient for forming mirror-like end surfaces at right angles at the ends of the optical fibers having different unsheathed fiber structures without changing the relative positional relationship between the clamp sections and the blade section, excluding the probability of a decrease in the life of the edge of the blade section and offering general applicability.

It is another object of the present invention to provide an optical fiber cleaving method of cleaving an unsheathed optical fiber extending between the clamp sections by scribing the surface thereof and then pushing it, wherein scores are easily and reliably imparted to the surfaces of the unsheathed fibers to a degree necessary and sufficient for forming mirror-like end surfaces at right angles at the ends of the optical fibers having different unsheathed fiber structures without changing the gap between the clamp sections.

In order to accomplish the above object, the invention as set forth herein provides an optical fiber cleaving device comprising a base section, a pair of clamp sections provided on said base section and spaced at a predetermined distance from each other for supporting an unsheathed optical fiber extending therebetween, a blade section provided movably relative to said base section and including an edge capable of being disposed at a fiber cleaving position defined between said clamp sections, and a pusher section provided movably relative to said base section independently of said blade section and including a pushing face capable of being disposed at said fiber cleaving position, wherein said optical fiber cleaving device comprises an auxiliary support section provided movably relative to said base section independently of said blade section and said pusher section, and capable of being disposed at an operable position for supporting an unsheathed optical fiber in cooperation with said clamp sections; and that said auxiliary support section includes a fiber support face locally located between said clamp sections at said operable position, said fiber support face being so arranged as to come in contact with a local length of an unsheathed optical fiber extending between said clamp sections, the local length being located away from said fiber cleaving position.

An invention as set forth herein provides the optical fiber cleaving device of that described above, wherein said auxiliary support section comprises a thin plate member including said fiber support face, a relief area formed adjacent to said fiber support face so as to be free of contact with a second local length of said unsheathed optical fiber located at said fiber cleaving position, and a holdable area formed adjacent to said fiber support face so as to be supported by said clamp sections together with said unsheathed optical fiber.

An invention as set forth herein provides the optical fiber cleaving device of that described above, further comprising a fiber holder detachably mounted on said base for holding an optical fiber to be cleaved, said thin plate member being attached to said fiber holder.

An invention as set forth herein provides the optical fiber cleaving device of that described above, further comprising a cover section coupled to said base section in an openable/closable manner, wherein said auxiliary support section comprises a piece member movably attached to said cover section and including said fiber support face in one end face thereof.

An invention as set forth herein provides the optical fiber cleaving device of that described above, further comprising a cover section coupled to said base section in an openable/closable manner, wherein said auxiliary support section comprises a disc member rotatably attached to said cover section and including said fiber support face in an outer peripheral surface thereof.

An invention as set forth in herein provides the optical fiber cleaving device of that described above, wherein said disk member is provided in said outer peripheral surface with a plurality of fiber support faces having different sizes in a rotation-axis direction and an inoperable face arranged to be deviated toward a rotation center relative to said fiber support faces.

An invention as set forth in herein provides a method for cleaving optical fibers, wherein the method comprises providing a pair of clamp sections capable of respectively supporting an unsheathed optical fiber, and spacing said clamp sections at a predetermined distance from each other; providing an auxiliary support member including a fiber support face capable of supporting an unsheathed optical fiber in cooperation with said clamp sections; supporting an unsheathed optical fiber on said clamp sections so as to extend between said clamp sections; securely arranging said auxiliary support member relative to said clamp sections in a manner that said fiber support face come in contact with a first local length of said unsheathed optical fiber extending between said clamp sections; locally scribing a surface of a target point in a second local length of said unsheathed optical fiber, adjacent to said first local length, between said clamp sections in a direction generally perpendicular to an axis of said unsheathed optical fiber; and applying a pushing force to said second local length of said unsheathed optical fiber in a radial direction between said clamp sections, so as to cleave said unsheathed optical fiber at said target point.

In recent years, there has been developed an optical fiber equipped with a permanent resin coating (which cannot be easily removed) to protect the outer surface of the cladding of the unsheathed fiber. The protective coating works to protect the outer surface of the cladding from the scars due to rubbing and scratches at the time of removing the sheath of the optical fiber or at the time of subsequent cleaving of the optical fiber. When it is attempted to cleave the optical fiber provided with the protective coating by using the above-mentioned conventional cleaving device, however, the cladding of the optical fiber is not scribed to a required depth by the edge of the blade section due to the presence of the protective coating.

In the field of optical fibers nowadays, standard sizes have been specified concerning the outer diameters of the unsheathed fibers, and even the optical fibers with the protective coating have been so produced that the outer diameters of the unsheathed fibers inclusive of the protective coating comply with the standard sizes. When compared on the basis of the same standard sizes, therefore, the optical fibers with the protective coating possess outer diameters of the claddings which are smaller than those of the optical fibers without the protective coating and, hence, the rigidity slightly decreases correspondingly. If the cleaving device disclosed, for example, in the above patent document 1 is used for the optical fibers of different kinds having the same standard sizes, the cleaving device having a positional relationship between the clamp sections and the blade section determined in advance exclusively for the optical fibers of particular standard sizes, then, different scribing actions are imparted by the blade section. Concretely speaking, if it is attempted to cleave the optical fiber with the protective coating by using the cleaving device that has been designed for the optical fibers without protecting coating, the latter unsheathed optical fiber supported on the clamp sections to extend therebetween presents its hard protective coating that can be scored little to the edge of the blade section when the edge of the blade section is brought into contact with the surface thereof, whereby the unsheathed fiber slightly slides relative to the clamp sections and is easily deflected. As a result, the distance between the cladding and the edge is expanded by a thickness of the protective coating, making it further difficult to scribe the cladding by a necessary amount by the edge.

In order for the edge of the blade section to reliably penetrate through the hard protective coating of the unsheathed optical fiber extending between the clamp sections, it is recommended to decrease the gap between the clamp sections that serve as fixed fulcrums for the unsheathed fiber thereby to effectively increase the cutting load exerted on the protective coating from the edge (the load varies in reverse proportion to the third power of the distance between the fulcrums). Even in the cleaving device exclusively for the optical fibers of particular standard sizes, it can be contrived to adjust the gap between the clamp sections depending upon the kind of the optical fiber (e.g., whether it has the protective coating). In this case, however, it becomes necessary to accurately adjust the amount of deflection of the unsheathed optical fiber as desired at the time of scribing by using the edge. With the clamp gap-adjusting mechanism in the cleaving device as disclosed in the above patent document 2, however, it is estimated that a high degree of adjustment technology is required by the operators and, besides, highly accurate clamp guiding/positioning mechanism is required, deteriorating the yield depending on the skill of the operators, causing the structure of the cleaving device to become complex, driving up the cost, and requiring cumbersome maintenance work. In particular, it is required to perform the high-precision work of adjusting a clamp-distance whenever the types of optical fibers to be cleaved are changed, and as a result, labor and time will be consumed for the fiber cleaving operation.

The cleaving device of the above patent document 2 is further provided with the clamp gap-adjusting mechanism to optimize the curvature of deflection at the time when the unsheathed optical fibers having dissimilar outer diameters are to be cleaved by the pushing force. The deflection of the unsheathed fiber at the time when it is scribed by the blade section is directly and forcibly cancelled by bringing the holding plate that is separately disposed into contact with the scribed portion of the unsheathed fiber on the opposite side. With this constitution, an excess of frictional load is exerted on the edge of the blade section for every scribing operation, and the life of the edge may be shortened.

As another method of increasing the cleaving load that is given to the protective coating of the unsheathed optical fiber from the edge of the blade section, there can be contrived to increase the height of edge relative to the clamp sections (the load varies in proportion to the displacement). However, the mechanism for adjusting the height of edge of the blade section provided for the conventional cleaving device is provided for mainly a fine adjustment of the height, usually, in a unit of microns. In cleaving the optical fiber with the protective coating by using the cleaving device designed for the optical fibers without protective coating, therefore, even if the height of the edge is set to a maximum value by using the height adjustment mechanism, the edge is far from penetrating through the protective coating, and the cladding is not scribed to a required depth. Conversely, if the mechanism is structured to be capable of increasing the height of the edge so as to achieve an increased cleaving load that is required, the unsheathed fiber may be excessively bent during the scribing operation at the highest position, and the core and cladding may be damaged. Further, the edge height-adjusting mechanism itself involves such problems as decreasing the yield depending upon the skill of the workers, causing the structure of the cleaving device to become complex, driving up the cost, requiring cumbersome maintenance operation, etc.

It is estimated that the above problems appear conspicuously even when it is attempted to cleave, by using a single cleaving device, not only the optical fibers having different fiber structures such as having or without having protective coating but also the optical fibers of fiber structures having cores and claddings of different materials (quartz core/quartz cladding, quartz core/resin cladding, multi-component glass core/multi-component glass cladding, etc.).

DETAILED DESCRIPTION

Figure 1:
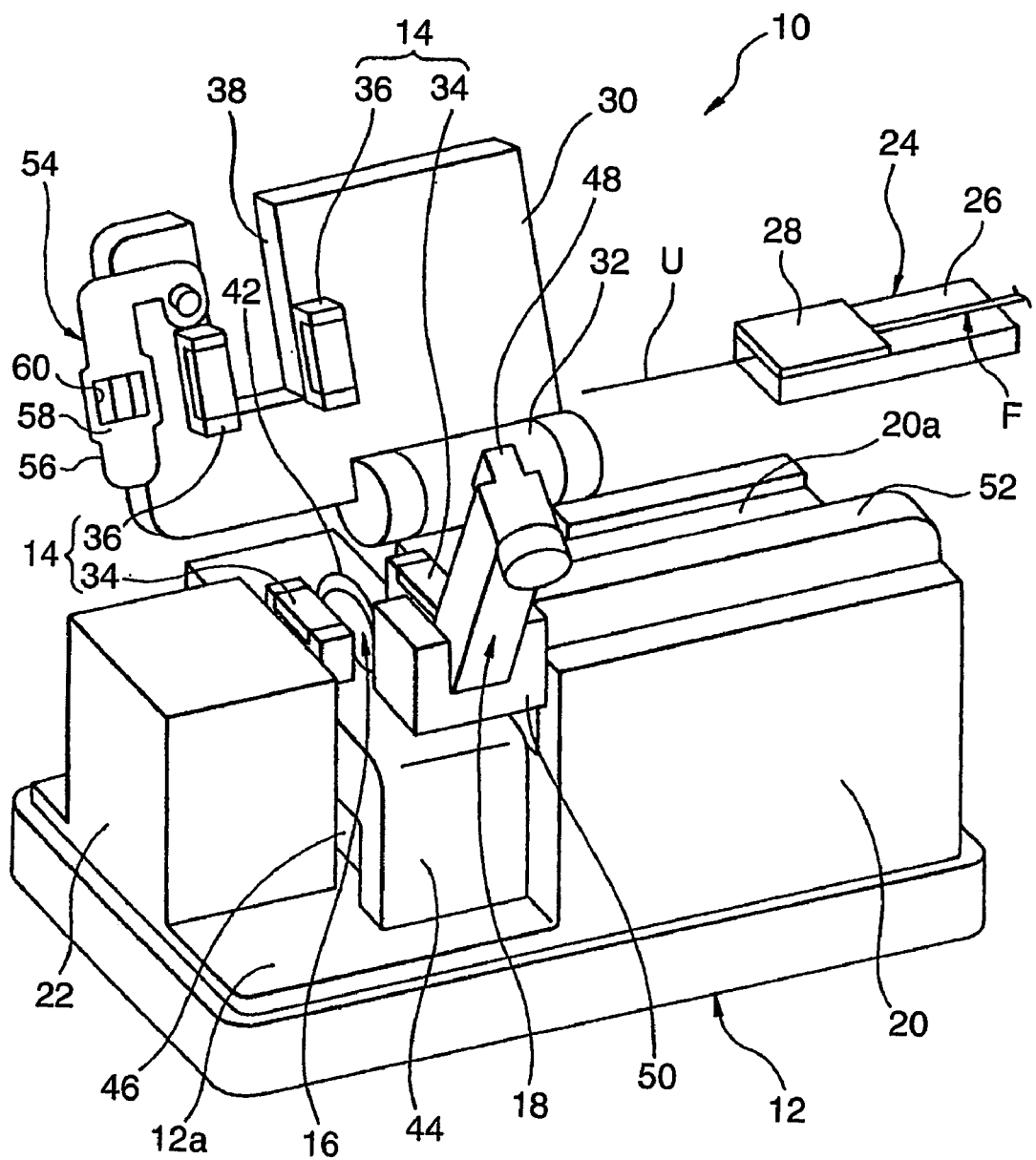
FIG. 1 is a perspective view illustrating an optical fiber cleaving device according to a first embodiment of the present invention in a state of being used.

An embodiment of the present invention will now be described in detail with reference to the accompanying drawings. In all of the drawings, the corresponding constituent elements are denoted by common reference numerals.

Figure 2:
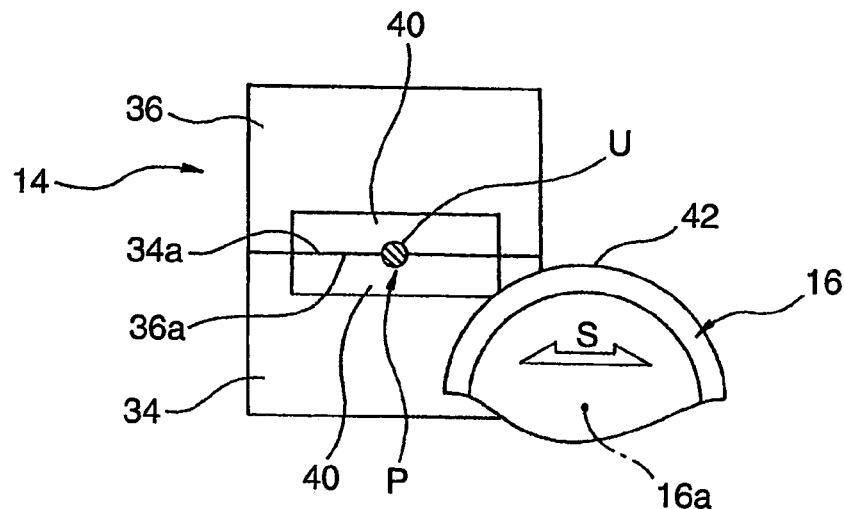
FIG. 2 is a view schematically illustrating a major portion of the optical fiber cleaving device of FIG. 1.
Figure 3A:
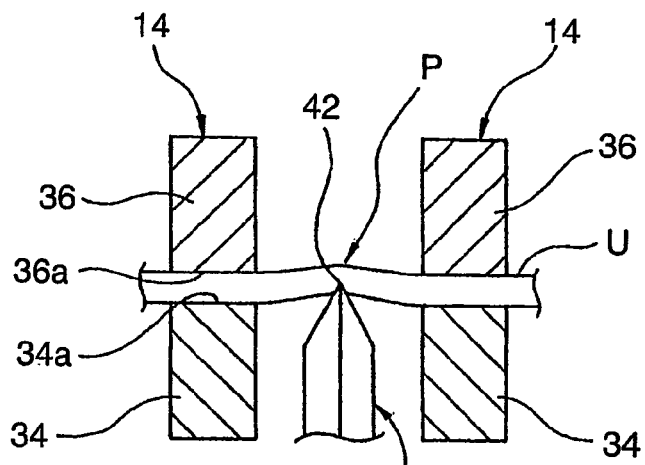
FIG. 3 is a view schematically illustrating the major portion of the optical fiber cleaving device of FIG. 1, wherein (a) is a view illustrating the scribing operation by an edge, and (b) is a view illustrating the pushing operation by a pusher section.
Figure 3B:
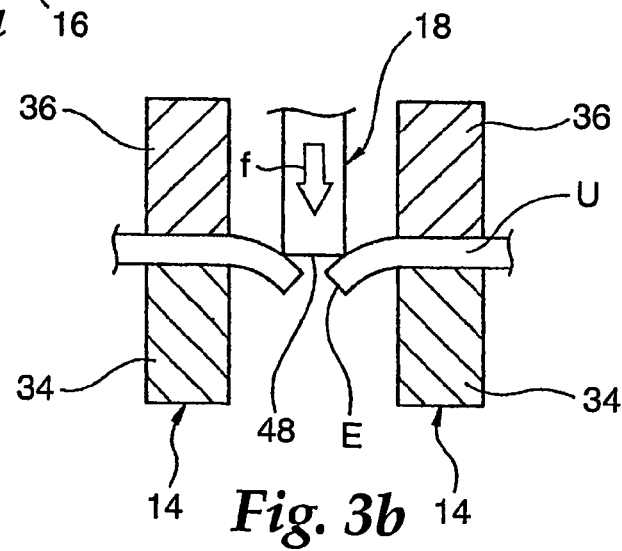

FIG. 1 is a view illustrating an optical fiber cleaving device 10 according to a first embodiment of the present invention, FIGS. 2 and 3 are views illustrating the constitution and action of major portions in the optical fiber cleaving device 10, FIG. 4 is a view illustrating the structure of an optical fiber to which the optical fiber cleaving device 10 can be applied, and FIGS. 5 to 9 are views illustrating the constitution and action of an auxiliary support section provided for the optical fiber cleaving device 10.

Referring to FIGS. 1 to 3, the optical fiber cleaving device 10 comprises a base section 12, a pair of clamp sections 14 secured on the base section 12 maintaining a predetermined gap relative to each other, a blade section 16 disposed on the base section 12 so as to move, and a pusher section 18 disposed on the base section 12 independently of the blade section 16 so as to move. The base section 12 is a rigid block of nearly a rectangular shape as viewed on a plane, and has a first base plate 20 and a second base plate 22 secured maintaining a gap relative to each other on the surface thereof (upper surface in the drawing) defining a horizontal plane that serves as a reference for the fiber cleaving operation. The first base plate 20 has a recessed portion 20a formed in the top surface thereof at a predetermined position and extending in a horizontal direction. In the recessed portion 20a is detachably mounted a fiber holder 24 for holding an optical fiber F that is to be cleaved at a predetermined position. The first plate 20 defines the position of one clamp section 14 on the base section 12, and the second base plate 22 defines the position of the other clamp section 14 on the base section 12. The clamp sections 14 are aligned on the base section 12 in a direction in which the recessed portion 20a extends, and are arranged on the same height.

The fiber holder 24 includes a rectangular and flat main body 26 that will be received by the recessed portion 20a of the first base section 20, and a rectangular and flat holder plate 28 rotatably coupled to one edge that extends in the lengthwise direction of the main body 26. In the surface of the main body 26 is provided a holding groove (not shown) capable of positioning and holding an optical fiber F of a predetermined size, and the holder plate 28 turns relative to the main body 26 to open and close the holding groove. The fiber holder 24 firmly holds the optical fiber F held in the holding groove in a state where the holder plate 28 is overlapped on the main body 26, and is, in this state, mounted on the recessed portion 20a of the first base plate 20 such that the optical fiber F is positioned at a predetermined position on the base section 12. As will be described later, the optical fiber F has its sheath removed over a desired length from an end thereof in a preparatory stage in the optical fiber cleaving process, whereby the unsheathed optical fiber U is exposed. The optical fiber F is held by the fiber holder 24 in a state where the unsheathed optical fiber U is extending outward.

The optical fiber cleaving device 10 further has a cover section 30 coupled to the base section 12 so as to be opened and closed. The cover section 30 is a rigid plate of nearly a rectangular shape as viewed on a plane, and is rotatably supported by the first base plate 20 on the base section 12 via a hinge 32 provided at an edge thereof. The pair of clamp sections 14 include a pair of first clamp members 34 secured to the base section 12 and a pair of second clamp members 36 secured to the cover section 30. The first clamp members 34 are secured to the first base plate 20 and to the second base plate 22 on the base section 12 to constitute local rectangular protuberances, respectively. On the other hand, the second clamp members 36 are secured onto the cover section 30 at positions where they are abut to the first clamp members 34 to similarly constitute local rectangular protuberances. In the cover section 30 is formed a notch 38 penetrating in the direction of thickness of the plate between the second clamp members 36 and opening at the edge on the side opposite to the hinge 32.

The first clamp members 34 and the second clamp members 36 of the clamp sections 14 have nearly flat clamp surfaces 34a and 36a at their protruded ends. The clamp surfaces 34a, 36a have such a shape that they are abut together in an intimately contacted manner when the cover section 30 is at a closed position covering the upper side of the base section 12. Desirably, the clamp surfaces 34a and 36a are formed by elastic pieces 40 such as of a rubber attached to the clamp members 34, 36. The clamp surfaces 34a of the first clamp members 34 are arranged on the same imaginary horizontal plane on the base section 12. Further, the clamp surfaces 36a of the second clamp members 36 are arranged on the same imaginary plane on the cover section 30, and, hence, come into surface contact with all of the clamp surfaces 34a of the first clamp members 34 simultaneously accompanying the closing operation of the cover section 30. Owing to the above constitution of the clamp sections 14, the unsheathed fiber U of the optical fiber F is supported between the pair of clamp sections 14 at a predetermined height on the base section 12 correctly extending in the horizontal direction at the time of effecting the optical fiber cleaving process.

The blade section 16 has a disk-like shape with a center axis 16a, and is forming a sharp arcuate edge 42 of, for example, a super hard material along the outer circumferential edge thereof. The blade section 16 is firmly supported by a moving plate 44 received in space between the first base plate 20 and the second base plate 22 on the base section 12 in such a manner that the edge 42 is exposed to a predetermined height. The moving plate 44 is mounted on the base section 12 so as to linearly reciprocate via a linear guide 46 in a horizontal direction S at right angles with the unsheathed optical fiber U extending between the clamp sections 14. The blade section 16 has its edge 42 arranged in parallel with the direction S in which the moving plate 44 moves, whereby the edge 42 is arranged at a fiber cleaving position P defined between the clamp sections 14 (nearly at the center in the drawing). Namely, the fiber cleaving position P is defined within a linearly moving passage of the edge 42.

At the optical fiber cleaving process, the blade section 16 is continuously moved by, for example, hand on the base section 12 in a horizontal direction from the initial position shown in FIG. 2 to approach the unsheathed optical fiber U supported by the clamp sections 14. At a moment when the edge 42 of the blade section 16 passes through the fiber cleaving position P, the outer surface of the cladding of the unsheathed fiber U is scored (scribed) in a direction nearly at right angles with the axis of the unsheathed fiber U (FIG. 3(a)). Next, the blade section 16 is disposed separated away from the unsheathed fiber U on the side opposite to the initial position. In this state, the fiber pushing (cleaving) operation is effected by the pusher section 18. Thereafter, the blade section 16 is returned to the initial position to wait for the next optical fiber cleaving process. The blade section 16 can be turned about the axis 16a to renew the edge 42. Further, there may be provided an edge height-adjusting mechanism, that is not shown, in order to finely adjust the height of the edge 42 in a unit of microns relative to the clamp surfaces 34a of the first clamp members 34 of the clamp sections 4 on the base section 12.

The pusher section 18 assumes the form of a swing arm with a rotary axis and has a nearly flat pushing face 48 at its free end facing in the rotational direction. The pusher section 18 is rotatably supported at its base end by a pivot plate 50 provided on the first base plate 20 of the base section 12. The pivot plate 50 is secured to an end of a mounting arm 52 disposed on the first base plate 20 along the edge on the side opposite to the hinge 32 of the cover section 30, and is arranged being spaced part over the moving passage of the moving plate 44 on the base section 12. The pusher section 18 has its axis of rotation in parallel with the center axis 16a of the blade section 16, whereby the pushing face 48 is disposed at the fiber cleaving position P defined between the clamp sections 14. Namely, the fiber cleaving position P is defined within an arcuate moving passage of the pushing face 48. The swing arm of the pusher section 18 has such a size that can be received in a non-contacting manner by the notch 38 in the cover section 30 that is at the closed position on the base section 12. Also, in place of the illustrated structure, the pusher section 18 may be installed on the cover section 30, or the pusher section 18 may be interlocked with the blade section 16 or the cover section 30.

In the optical fiber cleaving process, after the operation for scribing the unsheathed fiber by the blade section 16, the pusher section 18 is caused to swing by, for example, hand in a direction to approach the unsheathed optical fiber U supported by the clamp sections 14 from the initial position shown in FIG. 1 on the base section 12. Then, the pushing face 48 of the pusher section 18 arrives at the fiber cleaving position P, and a pushing force f due to human hand is exerted on the outer surface of the cladding of the unsheathed fiber U in a direction nearly at right angles with the axis of the unsheathed fiber U on the side opposite to the score formed by the blade section. Therefore, tensile stress generates in the unsheathed optical fiber U with the score as a center, and the unsheathed optical fiber U is cleaved and cut at a target point to thereby form an end surface B (FIG. 3(b)). After the end of the optical fiber cleaving process, the pusher unit 18 is returned back to the initial position and waits for the next optical fiber cleaving process. A slot may be formed in the pushing face 48 of the pusher section 18, to avoid collision with the edge 42 of the blade section 16 due to careless operation, and also to prevent the cut end surface E of the unsheathed optical fiber U from being polluted.

Figure 4A:
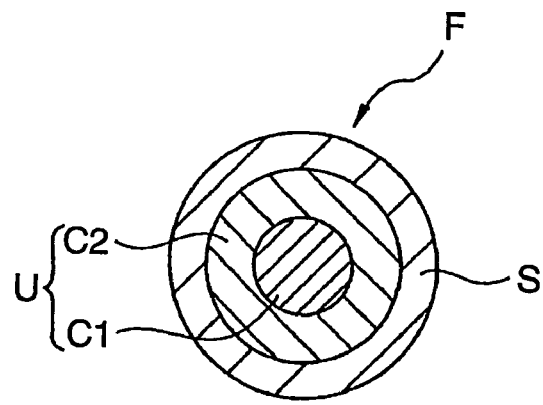
FIG. 4 is a sectional view of an optical fiber for which the optical fiber cleaving device of FIG. 1 can be used, wherein (a) illustrates a structure without the protective coating, and (b) illustrates a structure with the protective coating.

The optical fiber F that can be cleaved by the optical fiber cleaving device 10 is the one obtained by, as shown in FIG. 4(a), covering, with a resin sheath S, the unsheathed fiber U comprising a core C1 and a cladding C2, at least the core C1 being formed of quartz or a multi-component glass. In the optical fiber cleaving device 10, a relative positional relationship between the clamp sections 14 and the blade section 16 has been set in advance depending upon the outer diameter (e.g., international standard size) of the unsheathed optical fiber, so that a mirror-like end surface E can be formed at right angles on the optical fiber F at the cleaved end of the unsheathed fiber U. The optical fiber cleaving device 10 has been so constituted as to form a mirror-like end surface E at right angles at the cut end of the unsheathed fiber U' even for the optical fiber FIG. 4(b)) containing the unsheathed fiber U' having the same outer diameter as the outer diameter of the unsheathed fiber U but having a permanent resin protective coating C3 (that cannot be easily removed) for protecting the outer surface of the cladding C2 at the time of removing the sheath S, without the need of changing the positional relationship between the clamp sections 14 and the blade section 16.

Namely, the optical fiber cleaving device 10, further, has the auxiliary support section 54 disposed to move relative to the base section 12 independently of the blade section 16 and the pusher section 18, constituting a feature of the invention. The auxiliary support section 54 can be disposed at an operable position on the base section 12. At this operable position, the unsheathed optical fiber U' having the protective coating C3 is supported in cooperation with the clamp sections 14. The optical fiber cleaving device 10 effects the cleaving process for the unsheathed optical fibers U, U' of different kinds having the same outer diameter by suitably moving the auxiliary support section 54 between the operable position and the inoperable position to thereby highly accurately cleave the unsheathed optical fibers U, U'.

Figure 5:
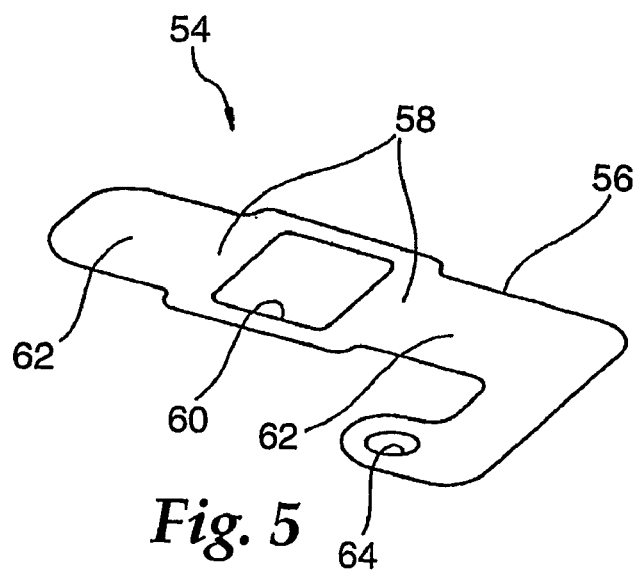
FIG. 5 is a perspective view of an auxiliary support section with which the optical fiber cleaving device of FIG. 1 is provided.
Figure 6:
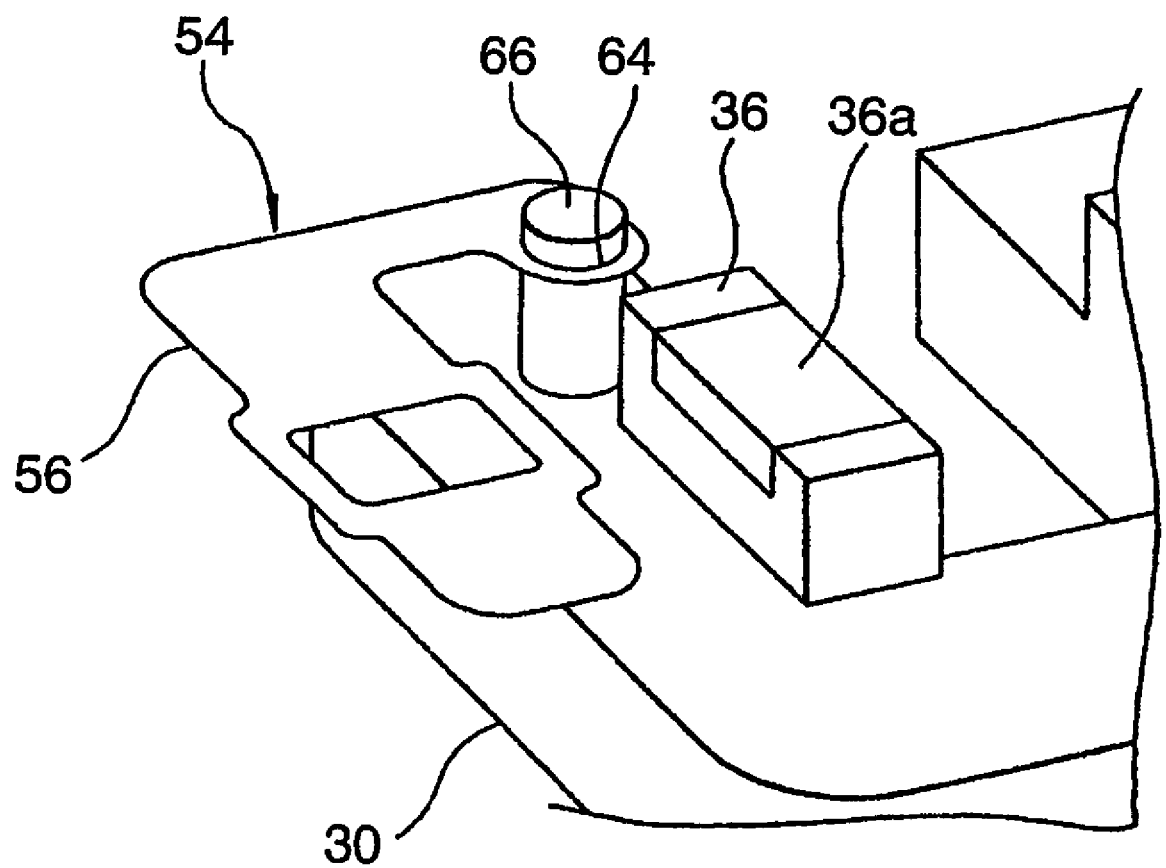
FIG. 6 is a perspective view illustrating, on an enlarged scale, the auxiliary support section in the optical fiber cleaving device.

In the illustrated embodiment, the auxiliary support section 54 is constituted by a thin plate member 56 formed by using a thin plate member inclusive of a sheet, a film, a foil or the like in a predetermined profile. Referring to FIG. 5, the thin plate member 56 has a pair of fiber support faces 58 that are separated on predetermined regions on one surface thereof, the pair of fiber support faces 58 locally located between the clamp sections 14 at the operable position of the auxiliary support section 54. When the thin plate member 56 is at the operable position, the fiber support faces 58 are so arranged as to come in contact with a pair of first local lengths L1 (see FIG. 7) of the unsheathed optical fiber U' supported to extend between the clamp sections 14, the first local lengths being located away from the fiber cleaving position P.

The thin plate member 56 further has a relief area 60 which is a through hole formed between the fiber support faces 58 adjacent thereto, and a pair of holdable areas 62 formed on the outer side of the two fiber support faces 58 adjacent thereto. When the thin plate 56 is at the operable position, the relief area 60 works to avoid the contact with a second local length L2 (see FIG. 7) of the unsheathed optical fiber U', located to extend through the fiber cleaving position P. When the thin plate member 56 is at the acting position, further, the pair of holdable areas 62 are supported by the clamp sections 14 together with the unsheathed optical fiber U'.

The thin plate member 56 further has a mounting hole 64 penetrating in the direction of thickness of the plate in an end region extending toward the outer side of one holdable area 62. The mounting hole 64 slidably receives a support pole 66 protruded at a desired position of the cover section 30 (near one second clamp member 36 in the drawing), whereby the thin plate member 56 is mounted on the cover section 30 so as to rotate in a direction in parallel with the fiber support faces 58 with the support pole 66 as a center. In the support pole 66 of the cover section 30, there can be formed a circumferential groove (not shown) for detachably fitting an edge of the mounting hole 64 of the thin plate member 56 at nearly the same height as the clamp surface 36a of the second clamp member 36 on the cover section 30. Further, the thin plate member 56 can be mounted on, for example, the second base plate 22 of the base section 12 instead of on the cover section 30.

Figure 7A:
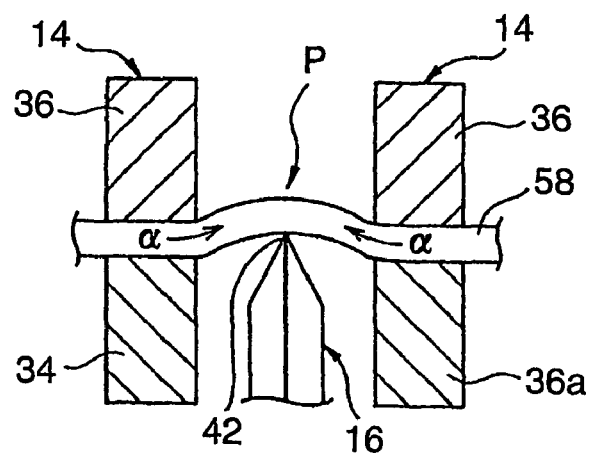
FIG. 7 is a view illustrating the operation of the auxiliary support section in the optical fiber cleaving device of FIG. 1, wherein (a) illustrates the scribing operation by the blade section of when the auxiliary support section is at the inoperable position, (b) illustrates the scribing operation by the blade section of when the auxiliary support section is at the operable position, and (c) illustrates the pushing operation by the pusher section of when the auxiliary support section is at the operable position.
Figure 7B:
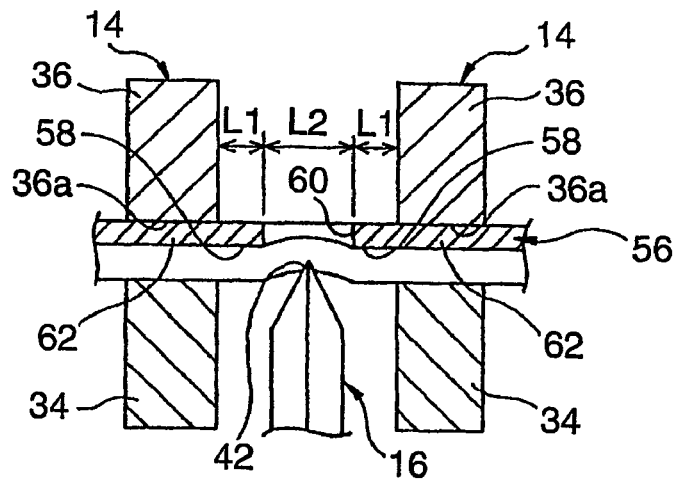

Operation of the auxiliary support section 54 having the above thin plate member 56 will now be described with reference to FIGS. 7 and 8.

The thin plate member 56 constituting the auxiliary support section 54 is placed at the inoperable position on the cover section 30 shown in FIG. 1 when the above-mentioned cleaving process (FIG. 3) is effected for the optical fiber F without the protective coating. When it is attempted to effect the same cleaving process for the optical fiber F' with the protective coating in a state where the thin plate member 56 is at the operable position, the unsheathed optical fiber U' supported on the pair of clamp sections 14 so as to extend therebetween has its hard protective coating C3 that is little likely to be scribed pushed against the edge 42, whereby the unsheathed fiber U' itself slides slightly with respect to the clamp sections 14 and is easily deflected (arrows a) (FIG. 7(a)). As a result, it becomes difficult to have the cladding C2 scribed to a degree necessary and sufficient by the edge 42 compounded by the fact that the distance between the cladding C2 and the edge 42 has been increased by a thickness of the protective coating C3 (FIG. 4).

Figure 7C:
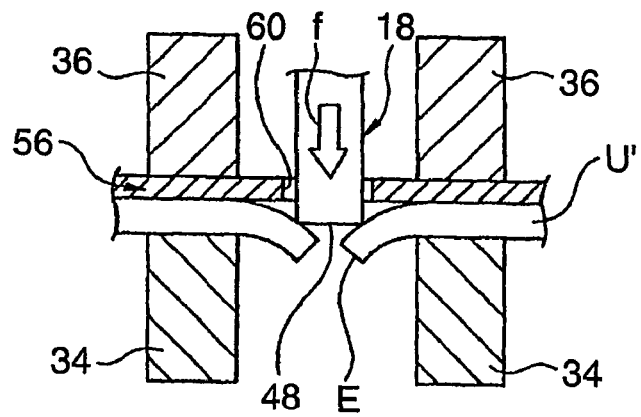
Figure 8:
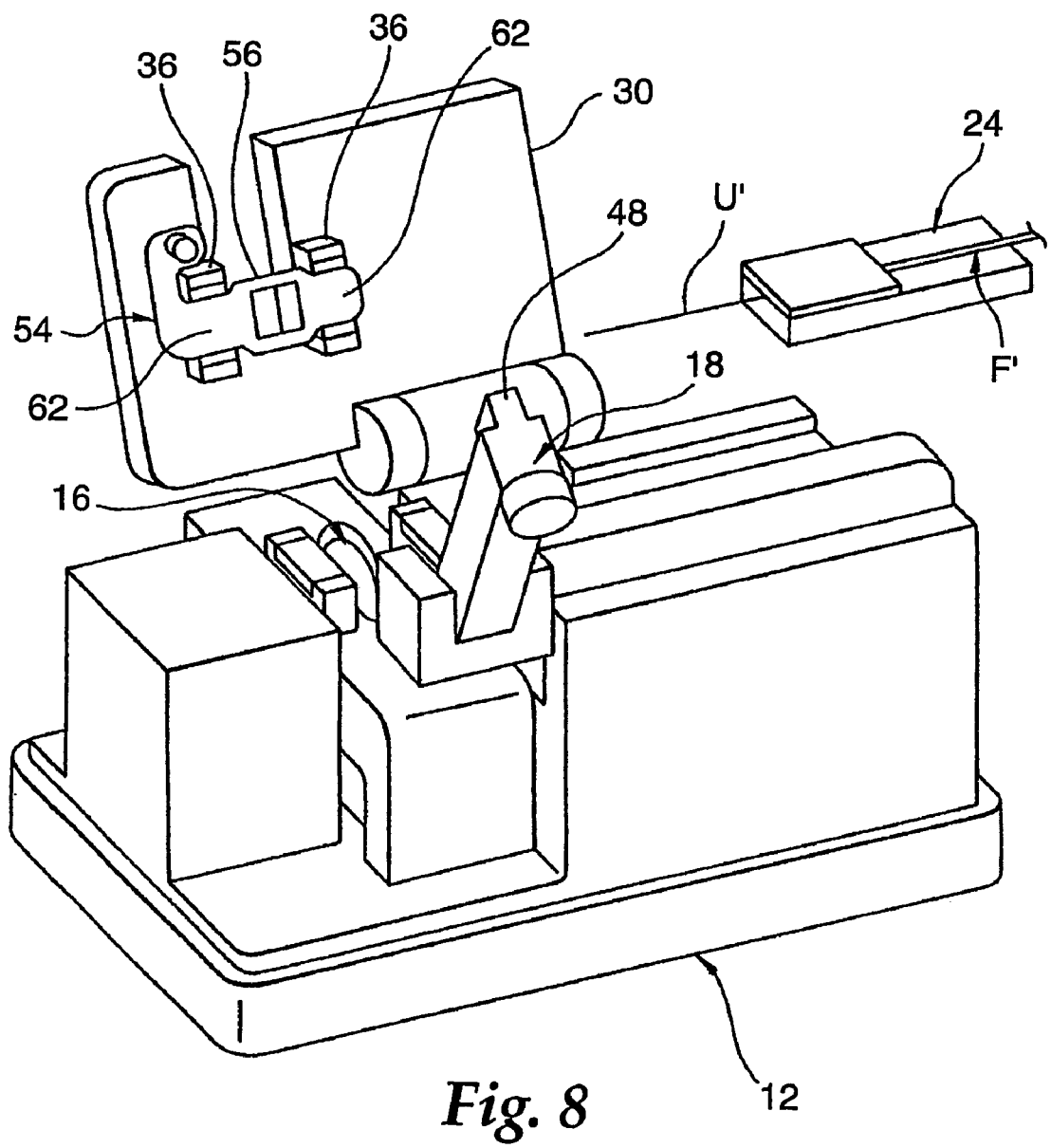
FIG. 8 is a perspective view illustrating the optical fiber cleaving device of FIG. 1 of when it is used in another way.

When the cleaving process is to be effected for the optical fiber F', therefore, the thin plate member 56 is turned on the cover section 30 from the inoperable position shown in FIG. 1 with the support pole 66 as a center, such that the pair of holdable areas 62 are overlapped on the pair of second clamp members 36 (FIG. 8). In this state, the cover section 30 is moved to a closed position relative to the base section 12, whereby the thin plate member 56 is disposed at the operable position, and the unsheathed optical fiber U' positioned at a predetermined place on the base section 12 by the fiber holder 24, is supported so as to extend between the two clamp sections 14 with the thin plate member 56 being interposed between the unsheathed optical fiber U' and the second clamp sections 36 (FIG. 7(*b*)). At this operable position, the pair of holdable areas 62 of the thin plate member 56 are held between the unsheathed optical fiber U' and the clamp faces 36*a* of the second clamp members 36, and the fiber support faces 58 come in contact with the local lengths L1 of the unsheathed optical fiber U', adjacent to the clamp sections 14.

In this state, the blade section 16 is so moved from the initial position (FIG. 2) that the edge 42 thereof is brought into contact with the surface of the unsheathed optical fiber U'. Then, the two fiber support faces 58 of the thin plate member 56 work as fulcrums for securing the unsheathed optical fiber U' in one direction receiving, at an upper side, the contacting force of the edge 42 from the lower side. Therefore, there is exhibited the same effect as that of when the gap between the pair of clamp sections 14 is decreased, and an efficiently increased cleaving load is given to the protective coating C3 from the edge 42 (the load varies in reverse proportion to the third power of the distance between the fulcrums). Accordingly, the unsheathed optical fiber U' deflects little over the second local length L2 (FIG. 7(*b*)). As a result, the edge 42 of the blade section 16 reliably penetrates through the protective coating C3 of the unsheathed optical fiber U' at the fiber cleaving position P, and the edge 42 bites into the cladding C2 by an amount that is necessary and sufficient. During the scribing operation, the thin plate member 56 avoids the contact with the second local length L2 of the unsheathed optical fiber U' owing to the relief area 60. Despite the scribing operation is repeated, therefore, an excess of frictional load is not exerted on the edge 42 of the blade section 16, preventing a decrease in the life of the edge.

After the above scribing operation, the pusher section 18 is caused to swing in a direction to approach the unsheathed optical fiber U' supported by the clamp sections 14 from the initial position (FIG. 8) in a state where the blade section 16 is disposed separated away from the unsheathed fiber U on the side opposite to the initial position. Here, the swelling portion at the end of the pusher section having the pushing face 48 has been determined for its size in advance so as to pass together with the unsheathed optical fiber U', in a non-contacting manner, through the relief area 60 in the thin plate member 56 supported by the clamp sections 14. Then, at the fiber cleaving position P, the pushing face 48 exerts the pushing force f produced by, for example, hand onto the surface of the unsheathed fiber U' on the side opposite to the score produced by the blade section 16 in a direction nearly at right angles with the axis of the unsheathed fiber U' at the fiber cleaving position P. As a result, tensile stress generates in the unsheathed optical fiber U' with the score as a center, and the unsheathed fiber U' is cleaved at a desired portion to form an end surface E (FIG. 7(*c*)).

The thin plate member 56 constituting the auxiliary support section 54 is made of a material having a shape and a size, that are so selected as to exhibit the action of decreasing the gap between the fulcrums. The effect of decreasing the gap between the fulcrums is affected by a predetermined gap between the clamp sections 14, outer diameter of the cladding C2, thickness of the protective coating C3 of the unsheathed optical fiber U' that is to be cleaved, and the Young's modulus of the unsheathed optical fiber U'. As a material of the thin plate member 56, there can be used various materials such as metals, resins, rubbers, papers, cloths or the like that can be easily molded to assume a desired outer shape having a desired thickness. Further, the size of the fiber support faces 58 of the thin plate member 56 (particularly, the size of the unsheathed optical fiber U' corresponding to the local length L1) can be suitably set by taking into consideration the material of the thin plate member 56 and the deflection suppress amount required for the unsheathed fiber U'. In order to avoid an undesirable deformation of the thin plate member 56, the thin plate member 56 may be locally bent or may be locally provided with a rib or frame-like thickened portion in an area free from the unsheathed optical fiber U', so as to increase the strength of the thin plate member 56. Moreover, in order to apply the highly accurate cleaving process using the auxiliary support section 54 to many kinds of optical fibers of different constitutions (outer diameters of unsheathed fibers), it is advantageous to prepare many kinds of thin plate members 56 of various materials having various shapes and sizes.

Figure 9:
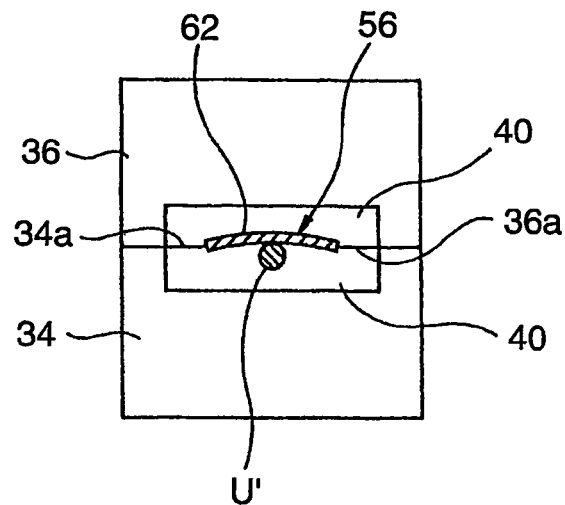
FIG. 9 is a view illustrating, on an enlarged scale, a clamping section in the optical fiber cleaving device of FIG. 1.

It is, further, desired that the holdable areas 62 of the thin plate member 56 have such sizes as will not extend beyond the elastic pieces 40 mounted on the first and second clamp members 34 and 36 of the clamp sections 14 in a direction at right angles with the axis of the unsheathed optical fiber U' that is to be supported when the thin plate member 56 is at the operable position (FIG. 9). According to this constitution, the unsheathed optical fiber U' and the holdable areas 62 of the thin plate member 56 bite into the elastic pieces 40 of the first and second clamp members 34 and 36, whereby the clamp surfaces 34*a* and 36*a* of the clamp members 34 and 36 are reliably and intimately contacted together and, as a result, the cover section 30 is held at the predetermined closed position relative to the base section 12.

According to the optical fiber cleaving device 10 constituted as described above, it is allowed to reliably form a mirror-like end surface E at right angles at an end of the unsheathed fiber U' of the optical fiber F' with the protective coating, the optical fiber F' having the unsheathed fiber U' of the same outer diameter as that of the unsheathed fiber U by simply placing the thin plate member 56 of the auxiliary support section 54 at the operable position without the need of changing the relative positional relationship between the clamp sections 14 and the blade section 16 that has been set in advance to effect the highly accurate cleaving process for the general optical fibers F without the protective coating. The auxiliary support section 54 is constituted by the thin plate member 56 of a simple structure which is inexpensive without causing such problems as complexity in the structure of the cleaving device or an increased cost. In the thin plate member 56, particularly, it is possible to precisely determine the position or height of the fiber support faces 58 on the base section 12 by only firmly clamp the holdable areas 56 in the clamp sections 14, so that it is possible to incorporate, in a low cost, the high-precision auxiliary support section 54 into optical fiber cleaving devices having conventional structures. In the fiber cleaving operation, the thin plate member 56 of the material having the shape and size that are so selected as to exhibit the above-mentioned action of decreasing the gap between the fulcrums, is held together with the unsheathed fiber U' by the clamp sections 14 to scribe the cladding C2 of the unsheathed fiber U' to a degree necessary and sufficient by the edge 42 of the blade section 16 relying upon an ordinary operation, to carry out the highly accurate cleaving operation without requiring skill of the worker. As for the wearing of the thin plate member 56, the thin plate member 56 mounted on the cover section 30 is so constituted as can be easily replaced without requiring complex maintenance operation.

The auxiliary support section 54 which is the thin plate member of the above embodiment can have a variety of constitutions.

Figure 10:
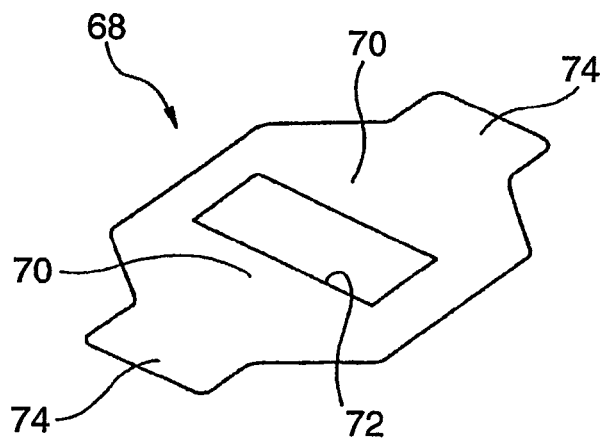
FIG. 10 is a perspective view illustrating a modified example of the auxiliary support section.

Referring, for example, to FIG. 10, a piece of thin plate member 68 punched in a symmetrical manner from the thin plate member can be handled as a member independent from the base section 12 and the cover section 30. The diagramed thin plate member 68 includes a pair of fiber support faces 70, a relief area 72 which is a through hole formed at the center between the fiber support faces 70 adjacent thereto, and a pair of holdable areas 74 formed on the outer sides of the two fiber support faces 70 adjacent thereto. The thin plate member 68 can be used at the above-mentioned operable position (being supported together with the unsheathed fiber U' by the clamp sections 14) during the step of cleaving the optical fiber F' with the protective coating.

Figure 11:
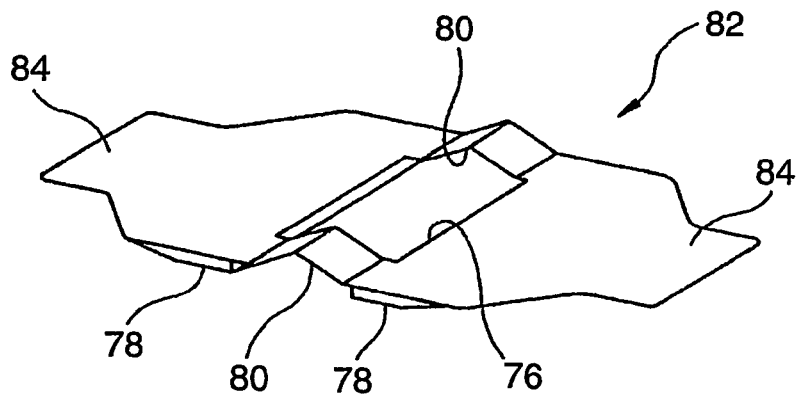
FIG. 11 is a perspective view illustrating another modified example of the auxiliary support section.

Referring to FIG. 11, further, there can be employed a thin plate member 82 having a pair of fiber support faces 78 formed on both sides of a central relief area 76 adjacent thereto, and a pair of grooves 80 formed on both sides of the relief area 76 adjacent thereto at positions different from the fiber support faces 78. The thin plate member 82 is placed at the above-mentioned operable position with its pair of grooves 80 being aligned in a direction in which the blade section 16 moves and being disposed facing the moving passage thereof. While the unsheathed fiber is being scribed by the blade section 16, therefore, the grooves 80 work to avoid the contact between the thin plate member 82 at the operable position and the edge 42 of the blade section 16 moving near the fiber cleaving position P. Accordingly, even when the height of the edge 42 of the blade section 16 has been set to be higher than the clamp faces 34a (FIG. 3) of the first clamp members 34, it is allowed to reliably avoid the contact between the thin plate member 82 and the edge 42 and, hence, to prevent damage to them in advance.

As shown in FIG. 11, further, the pair of fiber support faces 78 can be so formed as to swell on the surfaces of the holdable areas 84 formed on the outer sides thereof. According to this constitution, when the thin plate member 82 is placed at the operable position, the two fiber support faces 78 are disposed to be lower than the clamp faces 34a of the first clamp members 34 (i.e., disposed to be close to the blade section 16). In scribing the unsheathed fiber by using the blade section 16, therefore, the unsheathed optical fiber U' extending between the two clamp sections 14 is forcibly deflected over the local lengths L1 and L2 in a direction toward the blade section 16 along the two fiber support faces 78. As a result, the distance is shortened between the cladding C2 of the unsheathed optical fiber U' and the edge 42 of the blade section 16, and the cladding C2 can be scribed more reliably by the edge 42. Further, the size of the two fiber support faces 78 particularly, size corresponding to the local length L1 of the unsheathed optical fiber U') can be shortened by an amount by which the distance is shortened between the cladding C2 and the edge 42, and the size of the relief area 76 (particularly, size corresponding to the local length L2 of the unsheathed optical fiber U') can be increased.

Figure 12:
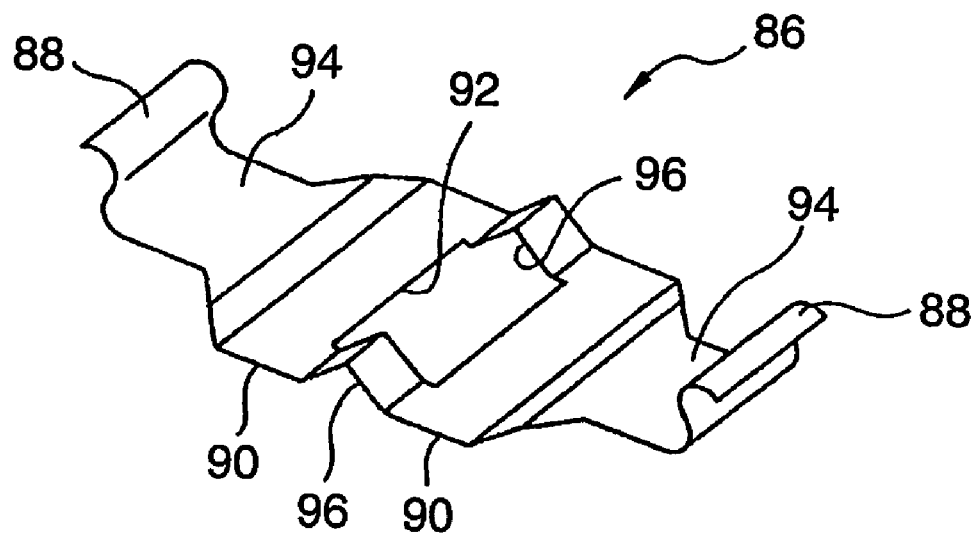
FIG. 12 is a perspective view illustrating a further modified example of the auxiliary support section.
Figure 13:
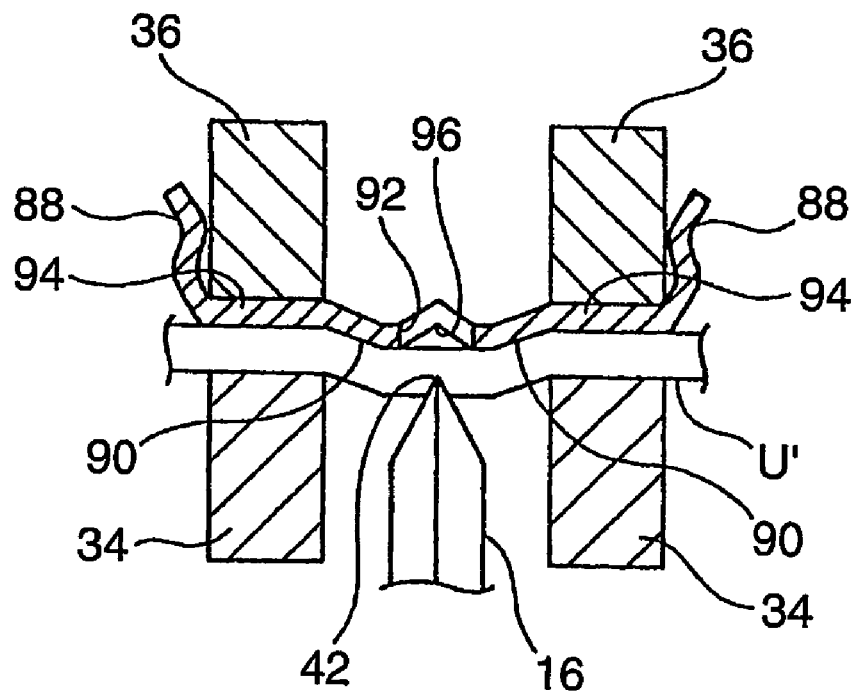
FIG. 13 is a view illustrating the operation of the auxiliary support section of FIG. 12.

The thin plate members 68 and 82 which are the independent members as described above can, as required, be used being suitably secured to the clamp faces 36a of the second clamp members 36 of the clamp sections 14 by using double-sided adhesive tapes. In their place or in addition thereto, a thin plate member 86 independent from the base section 12 and the cover section 30 can be provided, as shown in FIG. 12, with a pair of resilient arms 88 capable of holding the second clamp members 36 of the clamp sections 14. The thin plate member 86 can be detachably attached to the pair of second clamp members 36 via the resilient arms 88 so as to be disposed at the operable position (see FIG. 13).

The thin plate member 86 includes a pair of fiber support faces 90 which are swelling, a relief area 92 which is a through hole formed at the center between the fiber support faces 90 adjacent thereto, a pair of holdable areas 94 formed on the outer sides of the fiber support faces 90 adjacent thereto, and a pair of grooves 96 formed on both sides of the relief area 92 at positions different from the fiber support faces 90, and exhibits the action and effect same as those of the above-mentioned thin plate member 82. Here, the fiber support faces 78 and 90 of the swollen shape can be formed by locally increasing the thickness of the thin plate member 82 as shown in FIG. 11, or by folding portions of the thin plate member 86 as shown in FIG. 12.

Figure 14A:
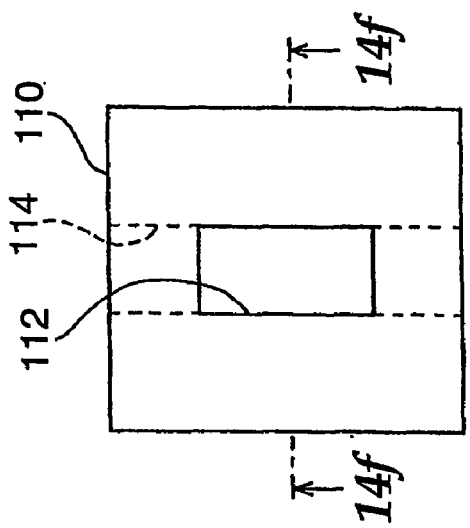
FIG. 14 is a view illustrating various examples of the auxiliary support section, wherein (a) is a plan view, (b) is a sectional view along the line B-B, (c) is a plan view, (d) is a sectional view along the line D-D, (e) is a plan view, and (f) is a sectional view along the line F-F.
Figure 14B:
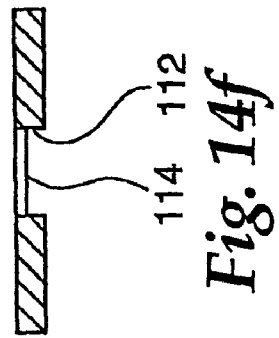
Figure 14C:
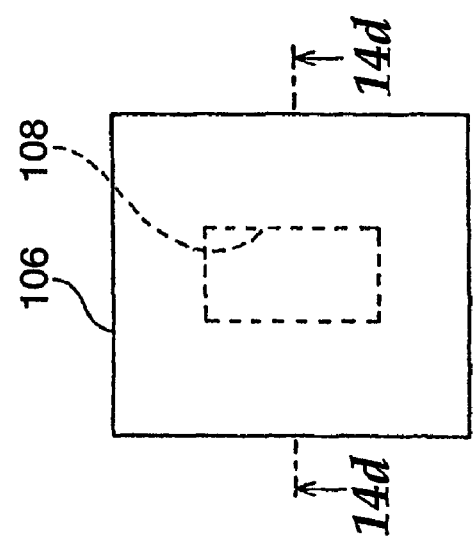
Figure 14D:
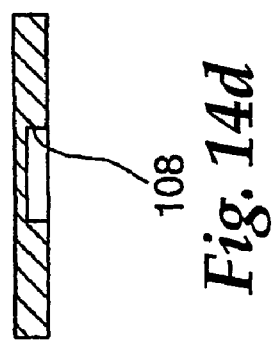
Figure 14E:
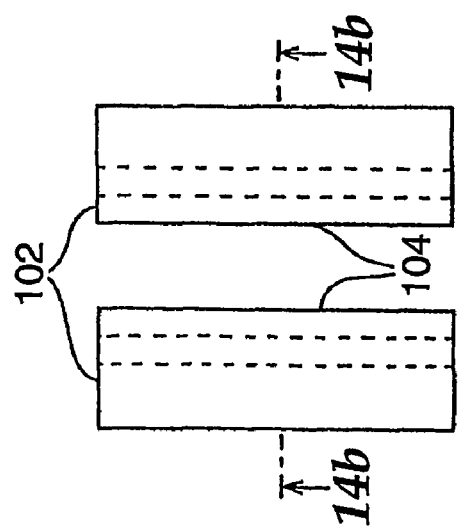
Figure 14F:
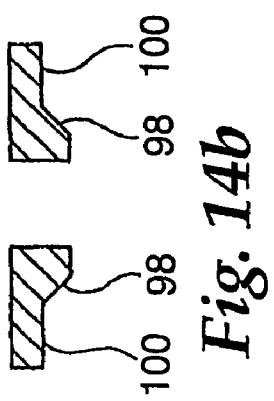

FIG. 14 illustrates further modified examples of independent thin plate members, in which two thin plate members 102 having a fiber support face 98 of a swollen shape and a flat holdable area 100, are arranged at the operable position so as to form a relief area 104 between the two (FIGS. 10(a) and 14(b)), in which a thin portion is formed at the center of the thin plate member 106 which, as a whole, is a flat plate to form a relief area 108 of a recessed form (FIGS. 14(c) and 14(d)), and in which thin portions are formed on both sides of a relief area 112 which is a through hole formed at the center of a generally flat thin plate member 110 thereby to form a pair of grooves 114 of a recessed form (FIGS. 14(e) and 14(f)).

Among them, it is desired that the thin plate member 106 is made of a resin film or a rubber plate so as to possess a sufficient degree of flexibility in at least the thin portion forming the relief area 108. According to this constitution, the pushing force due to the pushing face 48 can be reliably transmitted to the unsheathed fiber U relying upon the deformation of the thin portion during the unsheathed fiber pushing (cleaving) operation by the pusher section 18 in the cleaving process without the need of moving the thin plate member 106 from the operable position. In carrying out the unsheathed fiber pushing (cleaving) operation, however, if it is permitted to once move the cover section 30 to the open position relative to the base section 12 in order to separate the thin plate member away from the operable position, it is allowed in the present invention to employ even a thin plate member of a constitution that prevents the pushing operation by the pushing face of the pusher section 18.

Figure 15A:
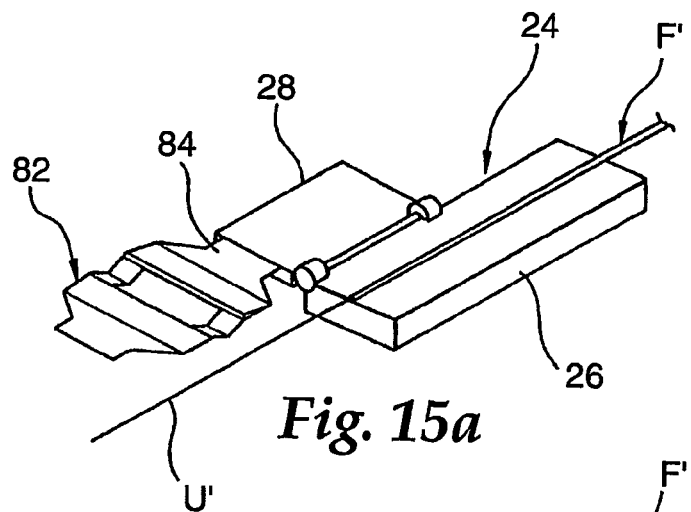
FIG. 15 is a perspective view illustrating a still further modified example of the auxiliary support section, wherein (a) illustrates a fiber holder at the open position, and (b) illustrates the fiber holder at the closed position.
Figure 15B:
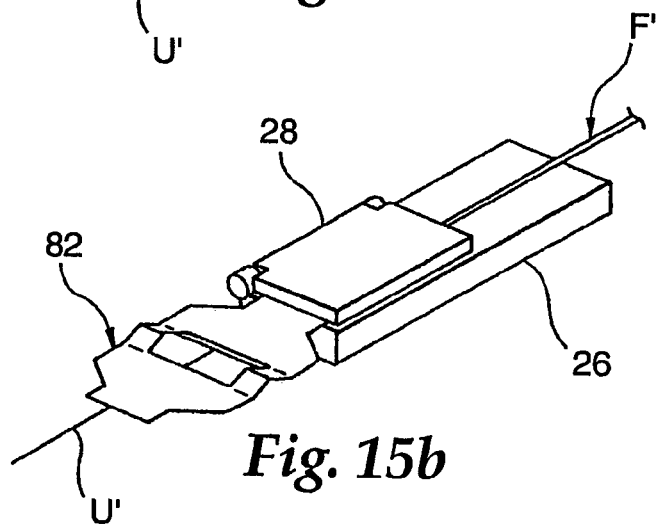

The auxiliary support section 54 made of the thin plate member can be used being mounted on the fiber holder 24 as shown in, for example, FIG. 15. In the illustrated embodiment, the thin plate member 82 shown in FIG. 11 is secured at the edge of its one holdable area 84 to the edge of the holder plate 28 of the fiber holder 24 on the side of leading out the unsheathed fiber (FIG. 15(a)). In this constitution, the fiber holder 24 holding the optical fiber F' (FIG. 15(b)) is mounted on the base section 12 to place the unsheathed fiber U' in position with respect to the clamp sections 14 and, at the same time, the thin plate member 82 is automatically disposed at the operable position.

In the above-mentioned embodiment and modified examples thereof, the auxiliary support section 54 constituted by the thin plate member is disposed at its operable position to be on the side opposite to the edge 42 of the blade section 16 that passes through the fiber cleaving position P with respect to the unsheathed optical fiber U' supported by the clamp sections 14. According to the present invention, however, it is also allowable, contrary to the above, to arrange, at its operable position, the auxiliary support section 54 constituted by the thin plate member on the side same as the edge 42 of the blade section 16 passing through the fiber cleaving position P with respect to the unsheathed optical fiber U supported by the clamp sections 14. According to the latter constitution, when a relative positional relationship between the clamp sections 14 and the blade section 16 has been so set that the optical fiber cleaving device 10 effects the highly accurate cleaving process to the optical fiber F' with the protective coating, the distance can be easily expanded between the unsheathed optical fiber supported by the clamp sections 14 and the edge 42 of the blade section 16 at the fiber cleaving position P by placing the thin plate member of the auxiliary support section 54 at the operable position. By simply placing the thin plate member of the auxiliary support section 54 at the operable position, therefore, a mirror-like end surface E can be reliably formed at right angles at the edge of the optical fiber F without the protective coating but having the unsheathed fiber U of the same diameter as the unsheathed fiber U' preventing the unsheathed fiber U from being cleaved to an excess degree.

As can be implied from the above various modified examples, the optical fiber cleaving method of the present invention is not necessarily to cleave the optical fiber by using the cleaving device equipped with the blade section and the pusher section intensively. If the optical fiber cleaving method according to the present invention is described in compliance with the above first embodiment, first, there are provided the pair of clamp sections 14 capable of supporting the unsheathed optical fibers U, U', the clamps 14 being so disposed as to maintain a predetermined gap between them. There is further provided the auxiliary support section (i.e., thin plate member 56) having a pair of fiber support faces 58 for supporting the unsheathed optical fiber U' in cooperation with the two clamp sections 14. Next, the unsheathed optical fiber U' is supported on the clamp sections 14 so as to extend between the clamp sections. Then, the thin plate member 56 is disposed in a fixed manner relative to the clamp sections 14 such that the fiber support faces 58 come in contact with the local lengths L1 of the unsheathed optical fiber U' extending between the clamp sections 14. In this state, the surface is locally scribed at a target point in the portion of the local length L2 of the unsheathed optical fiber U', adjacent to the local lengths L1, between the clamp sections 14 by using a desired edge in a direction nearly at right angles with the axis of the unsheathed fiber U'. Finally, the pushing force is applied by desired pushing faces onto the second local length L2 of the unsheathed optical fiber U' between the clamp sections 14 thereby to cleave the unsheathed fiber U' at the desired portion.

Figure 16:
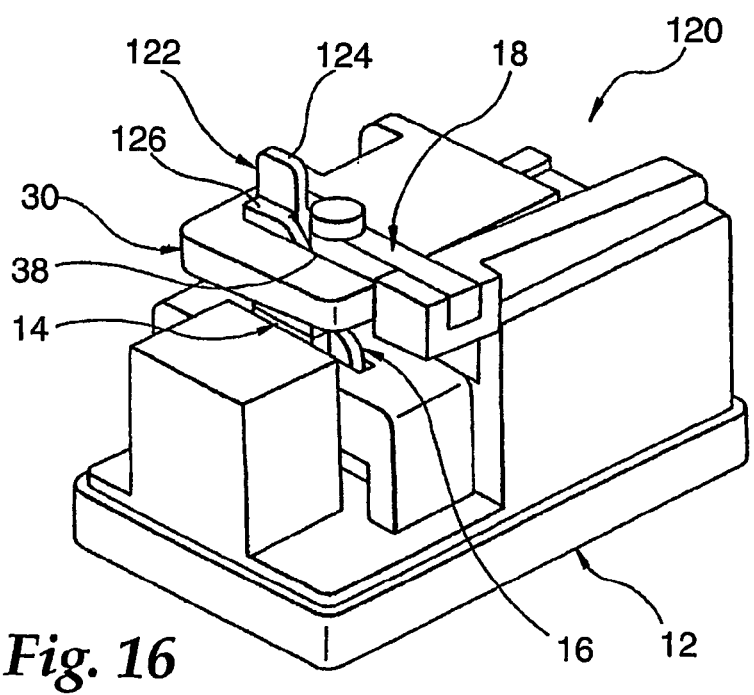
FIG. 16 is a perspective view of the optical fiber cleaving device according to a second embodiment of the present invention.

FIG. 16 illustrates an optical fiber cleaving device 120 according to a second embodiment of the present invention. The optical fiber cleaving device 120 is constituted in substantially the same manner as the optical fiber cleaving device 10 according to the first embodiment except the constitution of the auxiliary support section. Therefore, the corresponding constituent elements are denoted by common reference numerals but their description is not repeated. In the optical fiber cleaving device 120, a relative positional relationship between the clamp sections 14 and the blade section 16 has been so set in advance that the highly accurate cleaving process can be effected for the optical fiber F (FIG. 4(a)) without the protective coating.

The optical fiber cleaving device 120 is equipped with an auxiliary support section 122 movably disposed on the base section 12 independently from the blade section 16 and the pusher section 18, which is a characteristic constitution of the invention. The auxiliary support section 122 can be disposed on the base section 12 at the operable position. At the operable position, the auxiliary support section 122 supports the unsheathed optical fiber U' with the protective coating C3 (FIG. 4(b)) in cooperation with the clamp sections 14. The optical fiber cleaving device 120 effects the cleaving process for the unsheathed optical fibers U, U' of different kinds having the same outer diameter by moving the auxiliary support section 122 between the operable position and the inoperable position to thereby cleave the unsheathed optical fibers U, U' highly accurately.

Figure 17:
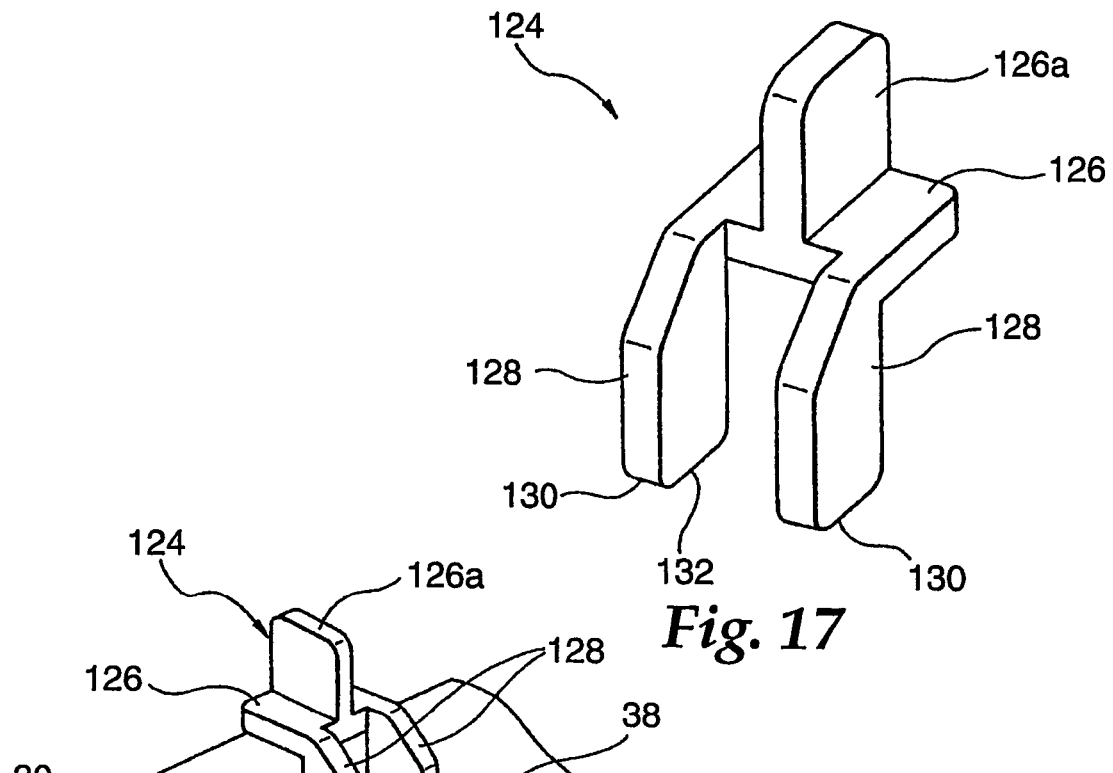
FIG. 17 is a perspective view of the auxiliary support section with which the is optical fiber cleaving device of FIG. 16 is provided.

The auxiliary support section 122 is constituted by a piece member 124 that is integrally formed in a predetermined shape. Referring to FIG. 17, the piece member 124 includes a base plate 126 with a knob 126a, and a pair of legs 128 extending nearly in parallel from the base plate 126, and has, at the ends of the legs 128, fiber support faces 130 locally located between the clamp sections 14 at the operable position of the auxiliary support section 122. When the frame piece 124 is at the operable position, the fiber support faces 130 are so disposed as to come in contact with the pair of portions having the local length L1 (see FIG. 19) of the unsheathed optical fiber U' supported on the clamp sections 14 so as to extend therebetween, the local length being located away from the fiber cleaving position P.

The piece member 124 has a relief area 132 formed between the legs 128 adjacent to the two fiber support faces 130. When the piece member 124 is at the operable position, the relief area 132 so works as to avoid the contact with the second local length L2 (see FIG. 19) of the unsheathed optical fiber U', extending through the fiber cleaving position P. The piece member 124 is so disposed that the base plate 126 thereof is brought in contact with the outer surface (upper surface in FIG. 16) of the cover section 30, has its legs 128 inserted in the notch 38 of the cover section 30 adjacent to the second clamp members 36 of the cover section 30, and is held in the notch 38 so as to slide therein due to friction and so on. When the cover section is at the closed position on the base section 12 with the piece member 124 being mounted on the cover section 30, the relief area 132 between the two legs 128 receive the swing arm of the pusher section 18 in a non-contacting manner.

Described below with reference to FIGS. 18 and 19 is the operation of the auxiliary support section 122 having the piece member 124.

Figure 18A:
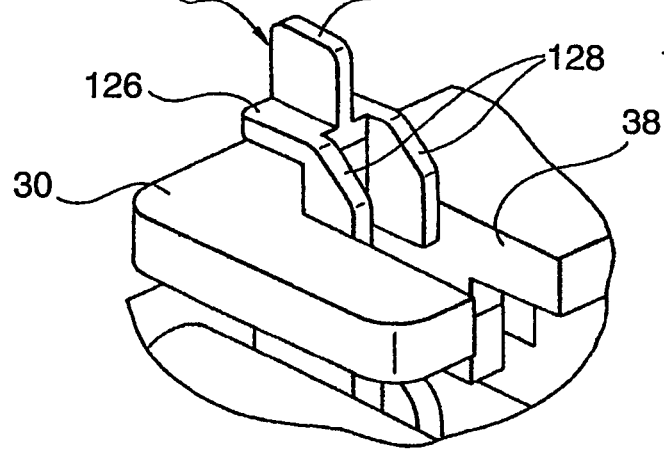
FIG. 18 is a view illustrating the operation of the auxiliary support section in the optical fiber cleaving device of FIG. 16, wherein (a) is a partial perspective view on an enlarged scale of when the auxiliary support section is at the inoperable position, and (b) is a view illustrating the scribing operation by the blade section of when the auxiliary support section is at the inoperable position.
Figure 18B:
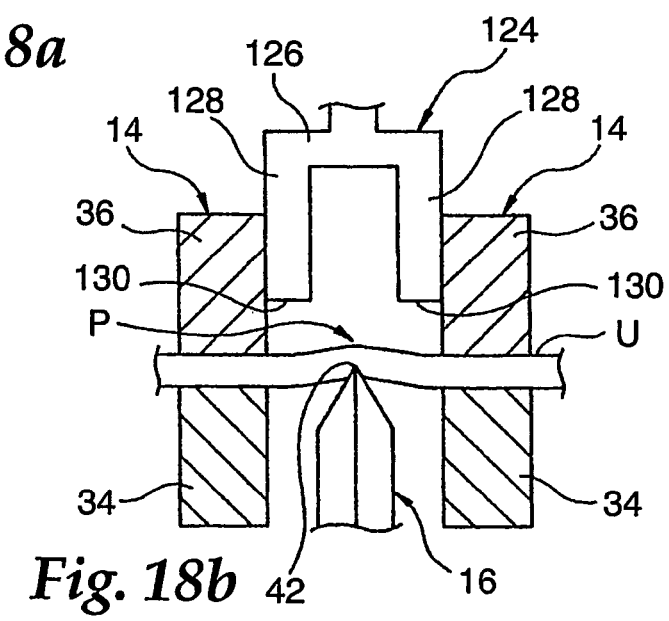

First, to effect the cleaving process for the optical fiber F (FIG. 4(a)) without the protective coating, as shown in FIG. 18(a), the piece member 124 constituting the auxiliary support section 122 is such that the knob 126a is operated by, for example, hand, so that the base plate 126 is placed on the cover section 30 at the inoperable position separated away from the cover section 30. When the cover section 30 is moved to the closed position relative to the base section 12, the legs 128 of the piece member 124 at the inoperable position have their fiber support faces 130 at the ends disposed on the cover section 30 being located away from the unsheathed optical fiber U extending between the clamp portions 14. In this state, the blade section 16 is directly operated on the base section 12, whereby the outer surface of the cladding of the unsheathed fiber U at the fiber cleaving position P is scribed (scored) by the edge 42 in a direction nearly at right angles with the axis of the unsheathed fiber U (FIG. 18(b)). Then, the pusher section 18 swings so as to exert the pushing force on the unsheathed optical fiber U due to the pushing faces 48 thereof, to cleave the unsheathed optical fiber U at the target point thereof (FIG. 3(b)). The actions by the blade section 16 and by the pusher section 18 are the same as those by the above-mentioned optical fiber cleaving device 10 at the cleaving process.

Figure 4B:
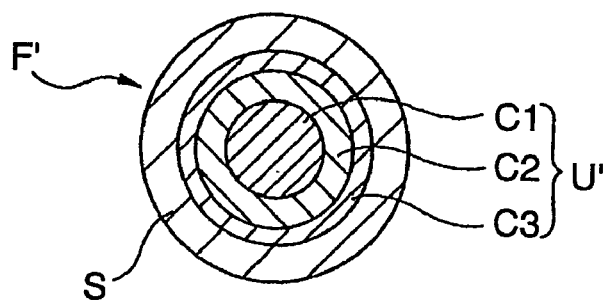
Figure 19A:
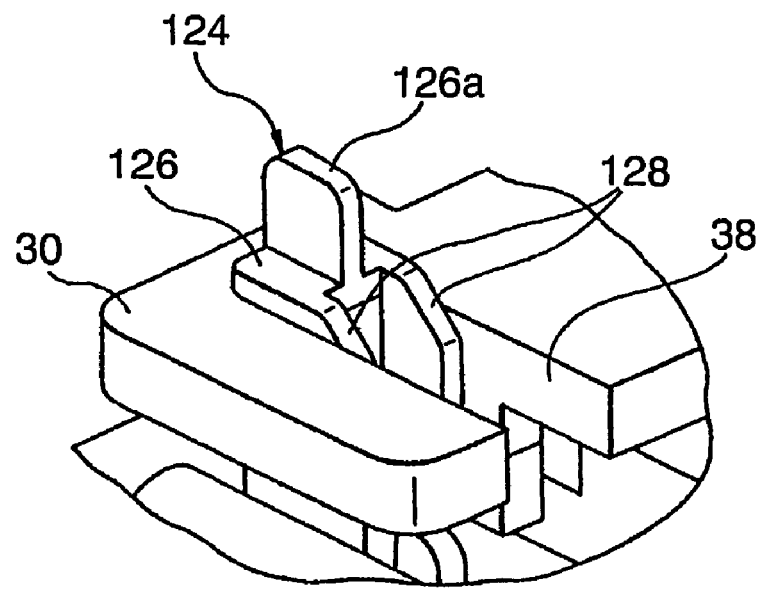
FIG. 19 is a view illustrating the operation of the auxiliary support section in the optical fiber cleaving device of FIG. 16, wherein (a) is a partial perspective view on an enlarged scale of when the auxiliary support section is at the operable position, and (b) is a view illustrating the scribing operation by the blade section of when the auxiliary support section is at the operable position.
Figure 19B:
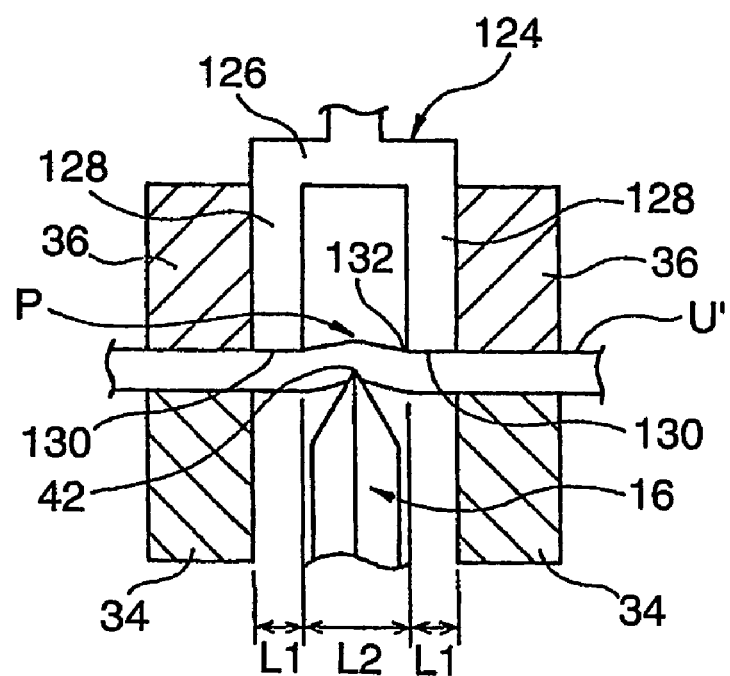

When the cleaving process is to be effected for the optical fiber F' with the protective coating (FIG. 4(b)), on the other hand, the piece member 124 is slid within the notch 38 of the cover section 30 from the inoperable position in FIG. 18 to a position where the base plate 126 comes in contact with the outer surface of the cover section 30 (FIG. 19(a)) before or after the unsheathed optical fiber U' is supported by the clamp sections 14 by disposing the cover section 30 at the closed position on the base section 12. Then, the piece member 124 is disposed at the operable position, and the fiber support faces 130 at the ends of the legs 128 are brought into contact with the pair of local lengths L1, located adjacent to the clamp sections 14, of the unsheathed optical fiber U' extending between the clamp sections 14.

In this state, the blade section 16 is directly operated on the base section 12 and the edge 42 is brought into contact with the surface of the unsheathed optical fiber U'. Then, the two fiber support faces 130 of the piece member 124 work as fixed fulcrums in one direction for the unsheathed fiber U' receiving, on the upper side, the contacting force of the edge 42 from the lower side, effectively increasing the cleaving load exerted on the protective coating from the edge 42 and decreasing the amount of deflection of the second local length L2 of the unsheathed fiber U' (FIG. 19(b)). As a result, the edge 42 of the blade section 16 reliably penetrates through the protective coating of the unsheathed optical fiber U' at the fiber cleaving position P and bites into the cladding by an amount which is necessary and sufficient. During the scribing operation, the piece member 124 is avoiding the contact with the second local length L2 of the unsheathed optical fiber U' owing to the relief area 132. Even when the scribing operation is repeated, therefore, excess of frictional load is not exerted on the edge 42 of the blade section 16, preventing a decrease in the life of the edge.

Next, the pusher section 18 swings, the pushing faces 48 thereof exert pushing force on the unsheathed optical fiber U to cleave it at a target point (see FIG. 7(c)). The actions by the blade section 16 and the pusher section 18 are the same as those at the cleaving process by using the above-mentioned optical fiber cleaving device 10.

The piece member 124 constituting the auxiliary support section 122 is made of a material that has been selected in advance in a shape and size so as to exhibit the action for decreasing the required distance between the fulcrums. As the material of the piece member 124, there can be used various materials such as a metal, a resin or the like having a rigidity for maintaining at least the shape of the fiber support faces 130 during the cleaving process. The size of the fiber support faces 130 of the piece member 124 particularly, the size corresponding to a portion of the local length L1 of the unsheathed optical fiber U') is suitably set by taking into consideration the amount of deflection required for the unsheathed fiber U'. The fiber support faces 130 of the piece member 124 can further be so constituted as to support the portions of a desired local length of the unsheathed fiber U' at positions slightly separated away from the clamp sections 14. It is advantageous to provide many kinds of piece members 124 of various materials having various shapes and sizes to effect the highly accurate cleaving process by using the auxiliary support section 122 for many kinds of optical fibers having different constitutions (outer diameters of the unsheathed fibers, etc.).

It can be comprehended that the action and effect same as those of the above-mentioned optical fiber cleaving device 10 can be obtained even by using the optical fiber cleaving device 120 constituted as described above. In particular, the optical fiber cleaving device 120 employs the auxiliary support section 122 constituted by the piece member 124 which has rigidity by itself, making maintenance further easy, such as preserving the auxiliary support section 122 and handling as compared to the auxiliary support section 54 made of the thin plate member 56 described above. In place of the illustrated structure, the piece member 124 may be arranged to be rotatable on the cover section 30.

Figure 20:
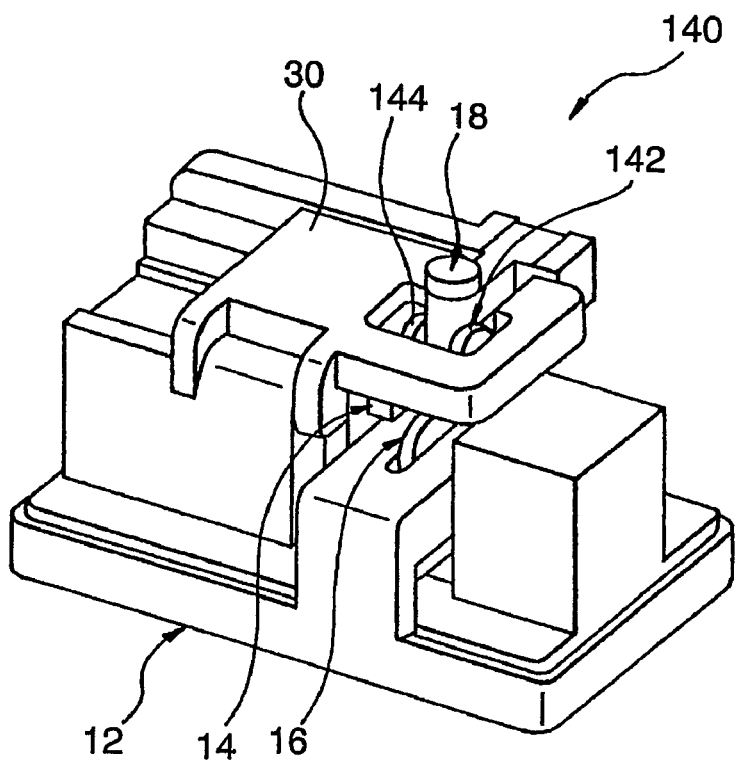
FIG. 20 is a perspective view of the optical fiber cleaving device according to a third embodiment of the present invention.

FIG. 20 illustrates an optical fiber cleaving device 140 according to a third embodiment of the present invention. The optical fiber cleaving device 140 is constituted in substantially the same manner as the optical fiber cleaving device 10 according to the first embodiment except the constitution of the auxiliary support section. Therefore, the corresponding constituent elements are denoted by common reference numerals but their description is not repeated. In the optical fiber cleaving device 140, a relative positional relationship between the clamp sections 14 and the blade section 16 has been so set in advance that the highly accurate cleaving process can be effected for the optical fiber F (FIG. 4(a)) without the protective coating.

The optical fiber cleaving device 140 is equipped with an auxiliary support section 142 movably disposed on the base section 12 independently from the blade section 16 and the pusher section 18, which is a characteristic constitution of the invention. The auxiliary support section 142 can be disposed on the base section 12 at the operable position. At the operable position, the auxiliary support section 142 supports the unsheathed optical fiber U' with the protective coating C3 (FIG. 4(b)) in cooperation with the clamp sections 14. The optical fiber cleaving device 140 effects the cleaving process for the unsheathed optical fibers U, U' of different kinds having the same outer diameter by moving the auxiliary support section 142 between the operable position and the inoperable position to thereby cleave the unsheathed optical fibers U, U' highly accurately.

Figure 21:
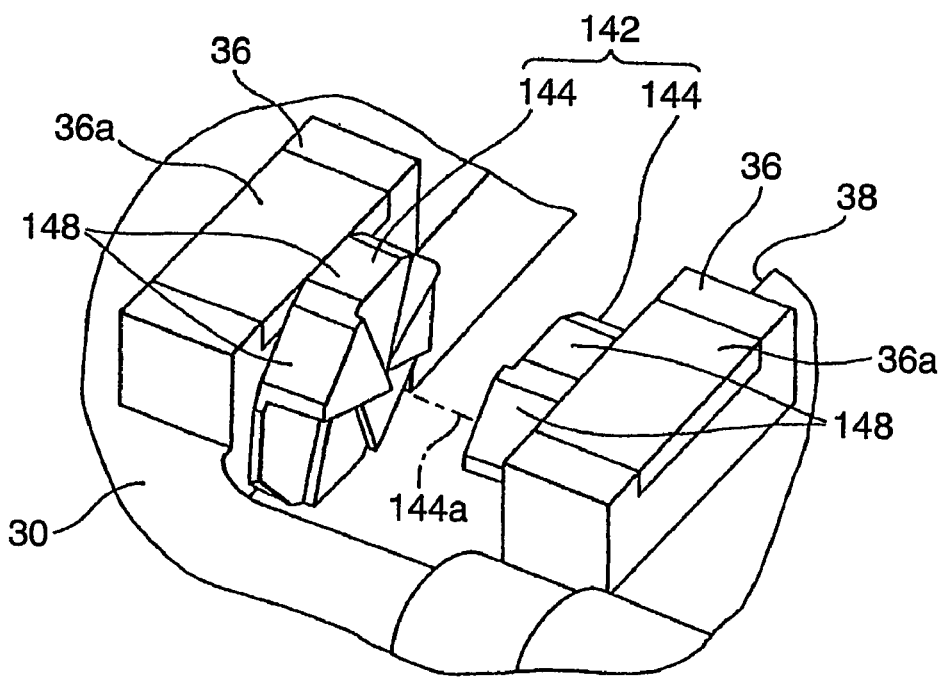
FIG. 21 is a perspective view illustrating on an enlarged scale the auxiliary support section in the optical fiber cleaving device of FIG. 20.
Figure 22:
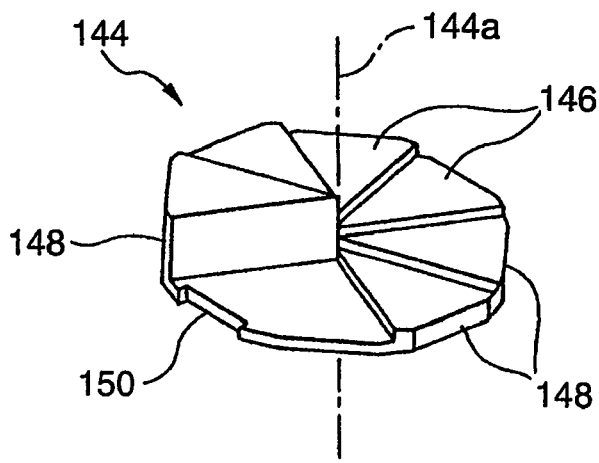
FIG. 22 is a perspective view of the auxiliary support section with which the optical fiber cleaving device of FIG. 20 is provided.

Referring to FIG. 21, the auxiliary support section 142 is constituted by a pair of disc members 144 each having a rotary axis 144a. The disc members 144 are rotatably mounted on the cover section 30 via pivot shafts that are not shown with the rotary axis 144a as a center. The disc members 144 are disposed adjacent to the second clamp members 36 in the notch 38 of the cover section 30. Referring to FIG. 22, each disc member 144 has a plurality of sectorial areas 146 divided into sectors with the rotary axis 144a as a center. The sectorial areas 146 have different thicknesses (sizes in the axial direction), and have nearly flat fiber support faces 148 of different sizes in the axial direction on the outer end surfaces in the radial direction of the sectorial areas 146 (on the outer peripheral surfaces of the disc member 144). The fiber support faces 148 are disposed at positions of an equal distance from the rotary axis 144a at the central portions in the circumferential direction thereof. Further, an inoperable face 150 is formed in the outer end surface in the radial direction of a desired sectorial area 146 (thinnest sectorial region 146 in the drawing) being deviated at a position closer to the center of rotation (i.e., axis 144a) from the fiber support faces 148.

When the disc members 144 are at the operable positions, the fiber support faces 148 of the disc members 144 are disposed to come in contact with the pair of local lengths L1 (see FIG. 23) of the unsheathed optical fiber U' supported to extend between the clamp sections 14, the local length being located away from the fiber cleaving position P. When the disk members 144 are at the operable positions, further, the space between the disc members 144 mounted on the cover section 30 work as relief area for avoiding the contact with the second local length L2 (see FIG. 23) of the unsheathed optical fiber U' that extends passing through the fiber cleaving position P. Due to the friction to the profile face of the notch 38 on the cover section 30, the disc members 144 are held at such rotational positions that desired fiber support faces 148 are neighbored to the clamp faces 36a of the second clamp members 36 in flush with each other. When the cover section 30 is at the closed position on the base section 12, the space between the disc members 144 work to receive the swing arm of the pusher section 18 in a non-contacting manner.

The operation of the auxiliary support section 122 having the disc member 144 will now be described with reference to FIG. 23.

Figure 23A:
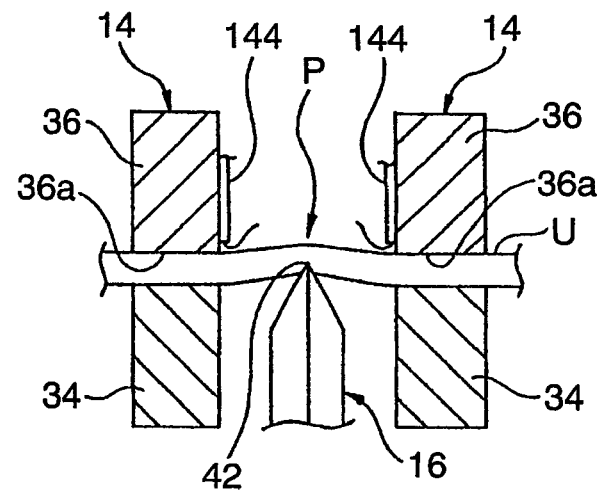
FIG. 23 is a view illustrating the operation of the auxiliary support section in the optical fiber cleaving device of FIG. 20, wherein (a) illustrates the scribing operation by the blade section of when the auxiliary support section is at the inoperable position, and (b) illustrates the scribing operation by the blade section of when the auxiliary support section is at the operable position.

First, when the cleaving process is to be effected for the optical fiber F (FIG. 4(a)) without the protective coating, the disc members 144 are turned by, for example, hand as shown in FIG. 23(a), whereby the inoperable faces 150 are brought to the inoperable positions adjacent to the clamp faces 36a of the second clamp members 36 on the cover section 30. When the cover section 30 is moved to the closed position relative to the base section 12, the inoperable faces 150 of the disk members 144 at the inoperable positions are disposed to be separated away from the unsheathed optical fiber U extending between the clamp sections 14. In this state, the blade section 16 is directly operated on the base section 12, whereby the outer surface of the cladding of the unsheathed fiber U at the fiber cleaving position P is scribed (i.e., scored) by the edge 42 in a direction nearly at right angles with the axis of the unsheathed fiber U. Then, the pusher section 18 is operated to swing, whereby a pushing force is exerted on the unsheathed optical fiber U from the pushing faces 48, and the target point is cleaved (see FIG. 3(b)). The actions of the blade section 16 and the pusher section 18 are the same as those obtained in the cleaving process by using the optical fiber cleaving device 10 described above.

Figure 23B:
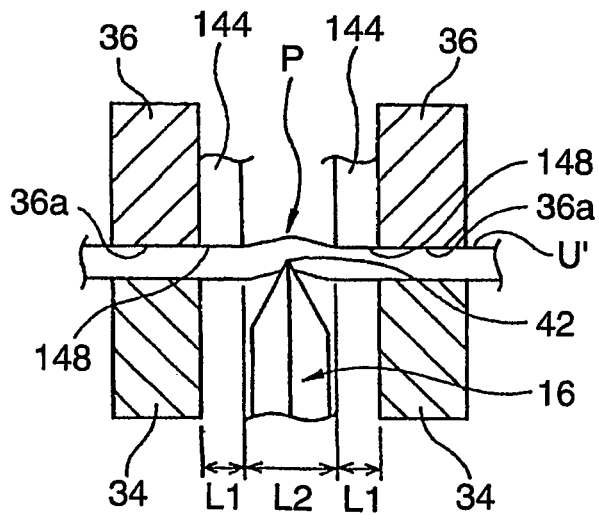

When the cleaving process is to be effected for the optical fiber F' with the protective coating FIG. 4(b)), on the other hand, the disc members 144 are turned within the notch 38 of the cover section 30 from the inoperable position in FIG. 23(a) to the positions where the desired fiber support faces 148 are neighbored to the clamp surfaces 36a of the second clamp members 36 (FIG. 23(b)) before or after the unsheathed optical fiber U' is supported by the clamp sections 14 by disposing the closure section 30 at the closed position on the base section 12. Then, the disc members 144 are disposed at the operable positions, and the desired fiber support faces 148 are brought into contact with the pair of local lengths L1, adjacent to the clamp sections 14, of the unsheathed optical fiber U' extending between the clamp sections 14.

In this state, the blade section 16 is directly operated on the base section 12 and the edge 42 is brought into contact with the surface of the unsheathed optical fiber U'. Then, the fiber support faces 148 of the disc members 144 work as fixed fulcrums in one direction for the unsheathed fiber U' receiving, on the upper side, the contacting force of the edge 42 from the lower side, effectively increasing the cleaving load exerted on the protective coating from the edge 42 and decreasing the amount of deflection of the second local length L2 of the unsheathed fiber U' (FIG. 23(b)). As a result, the edge 42 of the blade section 16 reliably penetrates through the protective coating of the unsheathed optical fiber U' at the fiber cleaving position P and bites into the cladding by an amount which is necessary and sufficient. During the scribing operation, the space between the disc members 144 serves as a relief area to avoid the contact with the second local length L2 of the unsheathed optical fiber U'. Even when the scribing operation is repeated, therefore, excess of frictional load is not exerted on the edge 42 of the blade section 16, preventing a decrease in the life of the edge.

Next, the pusher section 18 swings, the pushing faces 48 thereof exert pushing force on the unsheathed optical fiber U to cleave it at a target point (see FIG. 7(c)). The actions by the blade section 16 and the pusher section 18 are the same as those of the cleaving process by using the above-mentioned optical fiber cleaving device 10.

The disc members 144 constituting the auxiliary support section 122 are made of a material that has been selected in advance in a shape and size so as to exhibit the action for decreasing the required distance between the fulcrums. As the material of the disc members 144, there can be used various materials such as a metal, a resin or the like having a rigidity for maintaining at least the shape of the fiber support faces 148 during the cleaving process. The size of the fiber support faces 148 of the disc members 144 (particularly, the size corresponding to a portion of the local length L1 of the unsheathed optical fiber U') can be suitably set to a variety of sizes by taking into consideration the amount of deflection required for many kinds of the unsheathed fibers U' having different constitutions (outer diameters of the unsheathed fibers).

It can be comprehended that the action and effect same as those of the optical fiber cleaving device 10 can be obtained even by using the optical fiber cleaving device 140 constituted as described above. In particular, the optical fiber cleaving device 140 employs the auxiliary support section 142 constituted by the disc members 144 having rigidity by itself, offering such advantages as easier maintenance such as preservation of auxiliary support section 142 and handling as compared to the auxiliary support section 54 constituted by the thin plate member 56. By simply providing the disc members 144 of one kind only, further, there is obtained such an advantage that the highly accurate cleaving process can be effected by using the auxiliary support section 142 for many kinds of optical fibers having different constitutions (outer diameters of the unsheathed fibers, etc.).

In the foregoing were described preferred embodiments of the present invention in connection with the optical fibers F, F' having different fiber structures depending upon the presence or absence of protective coating. However, it can be comprehended that the present invention is in no way limited to the above applications but can further be applied even when it is attempted to cleave, by using a single kind of cleaving device, the optical fibers having different fiber structures using cores and claddings of different materials (such as quartz core/quartz cladding, quartz core/resin cladding, multi-component glass core/multi-component glass cladding, etc.).

EXAMPLES

Experiment 1

An experiment was conducted for cleaving an optical fiber F' with a protective coating by using the optical fiber cleaving device 10 shown in FIG. 1 under the conditions most suited for cleaving the optical fiber F without the protective coating while using, as the auxiliary support section 54, the thin plate member 56 of a brass having a thickness of 0.08 mm. The thin plate members 56 were provided in five kinds having relief areas 60 of sizes (sizes corresponding to L2 in FIG. 7) of 5 mm, 4 mm, 3 mm, 2 mm, 1 mm, and were successively exchanged to carry out the step of cleaving. The relief areas 60 of these thin plate members 56 were of such sizes (particularly, 1 to 4 mm) that did not permit the passage of the pushing faces 48 of the pushing section 18. After the scribing operation by the blade section 16, therefore, the cover section 30 was moved to the open position, and the thin plate member 56 was disposed at the inoperable position. The object optical fiber F' was a single-mode optical fiber (manufactured by 3M Co.) having a quartz cladding diameter of 100 μm and a mode field diameter of 9.2 μm, having a protective coating C3 of a thickness of 12.5 μm formed on the surface of the cladding C2 and an outer diameter of the unsheathed fiber U' of 125 μm in compliance with the International standard value. The sheath S was formed of an ultraviolet-ray curable resin, and the outer diameter of the product was 250 ml.

In the above experiment, when the thin plate members 56 having the relief areas 60 of 1 mm to 4 mm were disposed at the operable position, the unsheathed fiber of the optical fiber F' with the protective coating could be cleaved highly accurately. When the thin plate member 56 having the relief area 60 of 5 mm was disposed at the operable position and when the thin plate member 56 was not disposed at the operable position, the unsheathed fiber U' of the optical fiber F' with the protective coating could not be cleaved.

Experiment 2

An experiment was conducted for cleaving an optical fiber F' with a protective coating by using the optical fiber cleaving device 10 shown in FIG. 1 under the conditions most suited for cleaving the optical fiber F without the protective coating while using, as the auxiliary support section 54, the thin plate member 82 of a brass having a thickness of 0.08 mm. The thin plate member 82 possessed a relief area 76 of a size (size corresponding to L2 in FIG. 7) of 5 mm. A brass foil of a thickness of 0.03 mm was stuck onto both sides of the relief area 76 to form fiber support faces 78 of a swollen shape. The optical fibers F' being treated were the same as those of Experiment 1.

In the above experiment, the cleaving process were effected for four optical fibers F' with the protective coating. The unsheathed optical fibers U' could be highly accurately cleaved by any cleaving process. The inclinations of end surfaces E (angles with respect to a plane at right angles with the axis) formed on the unsheathed fibers U' were 0.8° on the average and were 1.5° at the greatest.

According to the present invention as will be apparent from the foregoing description, there is provided an optical fiber cleaving device for cleaving an unsheathed optical fiber extending between the clamp sections by scribing the surface thereof with the edge of the blade section and then pushing it, wherein scores are easily and reliably imparted to the surfaces of the unsheathed fibers to a degree necessary and sufficient for forming mirror-like end surfaces at right angles at the ends of the optical fibers having different unsheathed fiber structures without changing the relative positional relationship between the clamp sections and the blade section, excluding the probability of a decrease in the life of the edge of the blade section and offering general applicability.

According to the present invention, there is further provided an optical fiber cleaving method of cleaving an unsheathed optical fiber extending between the clamp sections by scribing the surface thereof and then pushing it, wherein scores are easily and reliably imparted to the surfaces of the unsheathed fibers to a degree necessary and sufficient for forming mirror-like end surfaces at right angles at the ends of the optical fibers having different unsheathed fiber structures without changing the gap between the clamp sections.

The invention claimed is:

1. An optical fiber cleaving device comprising a base section, a pair of clamp sections provided on said base section and spaced at a predetermined distance from each other for supporting an unsheathed optical fiber extending therebetween, a blade section provided movably relative to said base section and including an edge capable of being disposed at a fiber cleaving position defined between said clamp sections, and a pusher section provided movably relative to said base section independently of said blade section and including a pushing face capable of being disposed at said fiber cleaving position, wherein:

said optical fiber cleaving device comprises an auxiliary support section pivotably disposed on one of the base and a cover section, and provided separate from the clamp sections and movable relative to said base section independently of said blade section and said pusher section, and capable of being disposed at an operable position for supporting an unsheathed optical fiber in cooperation with said clamp sections; and said auxiliary support section includes first and second auxiliary support sections provided on both sides of the blade section when in the operable position, said first and second auxiliary support sections includes a fiber support face locally located between said clamp sections separately from fiber clamping surface of the fiber clamping sections at said operable position, said fiber support face being so arranged as to come in contact with a local length of an unsheathed optical fiber extending between said clamp sections, the local length being located away from said fiber cleaving position.

2. An optical fiber cleaving device according to claim 1, wherein said auxiliary support section comprises a thin plate member including said fiber support face, a relief area formed adjacent to said fiber support face so as to be free of contact with a second local length of said unsheathed optical fiber located at said fiber cleaving position, and holdable areas formed adjacent to both of said first and second fiber support faces so as to be clamped by clamping surfaces of said clamp sections together with said unsheathed optical fiber.

3. A method for cleaving optical fibers, wherein the method comprises:

providing a pair of clamp sections capable of respectively supporting an unsheathed optical fiber, and spacing said clamp sections at a predetermined distance from each other;

providing an auxiliary support member pivotably disposed on one of a base and a cover section, and separate from and movable relative to the clamp sections including a fiber support face capable of supporting an unsheathed optical fiber in cooperation with said clamp sections;

supporting an unsheathed optical fiber on said clamp sections so as to extend between said clamp sections;

securely arranging said auxiliary support member relative to said clamp sections in a manner that said fiber support face come in contact with a first local length of said unsheathed optical fiber extending between said clamp sections;

locally scribing a surface of a target point in a second local length of said unsheathed optical fiber, adjacent to said first local length, between said clamp sections in a direction generally perpendicular to an axis of said unsheathed optical fiber; and applying a pushing force to said second local length of said unsheathed optical fiber in a radial direction between said clamp sections, so as to cleave said unsheathed optical fiber at said target point.

* * * * *

UNITED STATES PATENT AND TRADEMARK OFFICE
CERTIFICATE OF CORRECTION

PATENT NO. : 7,669,744 B2
APPLICATION NO. : 10/595078
DATED : March 2, 2010
INVENTOR(S) : Akihiko Yazaki It is certified that error appears in the above-identified patent and that said Letters Patent is hereby corrected as shown below:

Column 1,
Line 7, delete "the" and insert in place thereof -- The --.
Line 53, delete "reproduceability" and insert in place thereof -- reproducibility --.

Column 3,
Line 30, delete "forth in" and insert in place thereof -- forth --.
Line 37, delete "forth in" and insert in place thereof -- forth --.

Column 6,
Line 29, before "optical" delete "is".

Column 9,
Line 32, delete "B" and insert in place thereof -- E --.
Line 54, delete "FIG. 4(b))" and insert in place thereof -- F' (FIG. 4(b)) --.

Column 13,
Line 61, delete "particularly," and insert in place thereof -- (particularly, --.

Column 14,
Line 44, delete "U" and insert in place thereof -- U' --.

Column 17,
Line 59, delete "particularly," and insert in place thereof -- (particularly, --.

Column 19,
Line 46, delete "FIG. 4(b))", and insert in place thereof -- (FIG. 4(b)) --.

Column 21,
Line 21, delete "250 ml" and insert in place thereof -- 250 μm --.

Signed and Sealed this

Twenty-fifth Day of May, 2010

David J. Kappos
*Director of the United States Patent and Trademark Office*